US011110600B2

(12) United States Patent
Yang

(10) Patent No.: US 11,110,600 B2
(45) Date of Patent: Sep. 7, 2021

(54) AIRPORT ROBOT AND OPERATION METHOD THEREOF

(71) Applicant: LG ELECTRONICS INC., Seoul (KR)

(72) Inventor: Sunho Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 278 days.

(21) Appl. No.: 16/339,233

(22) PCT Filed: Sep. 1, 2017

(86) PCT No.: PCT/KR2017/009589
§ 371 (c)(1),
(2) Date: Apr. 3, 2019

(87) PCT Pub. No.: WO2018/070663
PCT Pub. Date: Apr. 19, 2018

(65) Prior Publication Data
US 2019/0224843 A1    Jul. 25, 2019

(30) Foreign Application Priority Data

Oct. 10, 2016 (KR) ........................ 10-2016-0130612

(51) Int. Cl.
| | |
|---|---|
| *B25J 9/16* | (2006.01) |
| *G08B 7/06* | (2006.01) |
| *G06Q 50/30* | (2012.01) |
| *B25J 11/00* | (2006.01) |
| *G05D 1/02* | (2020.01) |
| *B25J 19/02* | (2006.01) |
| *G06Q 90/00* | (2006.01) |

(52) U.S. Cl.
CPC ............. *B25J 9/163* (2013.01); *B25J 9/1664* (2013.01); *B25J 11/00* (2013.01); *B25J 19/02* (2013.01);

(Continued)

(58) Field of Classification Search
CPC ... B25J 9/163; B25J 11/00; B25J 19/02; B25J 9/1664; B25J 9/16; B25J 5/00;
(Continued)

(56) References Cited

U.S. PATENT DOCUMENTS 3,571,990 A  *  3/1971  Rossman ................. B64F 1/00
                                                            52/30
5,797,330 A  *  8/1998  Li ............................ B61B 13/06
                                                            104/119
(Continued)

FOREIGN PATENT DOCUMENTS

KR    10-2008-0056669       6/2008
KR    10-2008-0090150      10/2008
(Continued)

OTHER PUBLICATIONS

International Search Report (with English Translation) and Written Opinion dated Dec. 6, 2017 issued in Application No. PCT/KR2017/009589.

*Primary Examiner* — Abby Y Lin
*Assistant Examiner* — Dylan M Katz
(74) *Attorney, Agent, or Firm* — Ked & Associates, LLP

(57) ABSTRACT

A robot may include an application processor (AP) configured to set a movement path through which driving is to be performed for a preset time, a display unit configured to display guidance information representing a movement path, and a driving driver configured to drive along the movement path, thereby guiding passengers to a destination, such as an airplane boarding position.

20 Claims, 20 Drawing Sheets

(52) U.S. Cl.
CPC ........... *G05D 1/0274* (2013.01); *G06Q 50/30* (2013.01); *G08B 7/066* (2013.01); *G05B 2219/50391* (2013.01); *G05D 1/0248* (2013.01); *G06Q 90/20* (2013.01)

(58) Field of Classification Search
CPC ... B25J 13/00; B25J 9/22; G05B 2219/50391; G06Q 50/30; G06Q 90/20; G06Q 50/10; G08B 21/00; G08B 7/066; G05D 1/0274; G05D 1/0248; G08G 5/065; G06F 19/00
See application file for complete search history.

(56) References Cited

U.S. PATENT DOCUMENTS

| | | | |
|---|---|---|---|
| 2008/0079383 A1* | 4/2008 | Nakamoto | G05D 1/0251 318/587 |
| 2008/0147261 A1 | 6/2008 | Ichinose et al. | |
| 2010/0094463 A1* | 4/2010 | Okabayashi | G06Q 90/00 700/264 |
| 2015/0360706 A1* | 12/2015 | Niinomi | B61L 27/0077 701/19 |
| 2016/0174459 A1* | 6/2016 | Balutis | G05D 1/0234 701/25 |
| 2018/0050634 A1* | 2/2018 | White | A47L 9/2805 |

FOREIGN PATENT DOCUMENTS

| | | | | |
|---|---|---|---|---|
| KR | 10-0904191 | 6/2009 | | |
| KR | 10-2011-0103537 | 9/2011 | | |
| KR | 10-2015-0081043 | 7/2015 | | |
| WO | WO-2012073301 A1 * | 6/2012 | ............. | G06Q 10/00 |

\* cited by examiner

FIG. 5

| AIRLINE | FLIGHT AIRLINE NAME | ESTIMATION TIME | CHANGED TIME | DESTINATION | CHECK-IN COUNTER | BOARDING GATE | CHANGED BOARDING GATE |
|---|---|---|---|---|---|---|---|
| A/AIRLINE | AB123 | 8:45 | | TSINGTAO | H19-H26 | 101 | |
| B/AIRLINE | BB432 | 8:55 | | BANGKOK | G25-G36 | 121 | |
| C/AIRLINE | CO001 | 9:00 | | HONG KONG | L01-M18 | 25 | |
| D/AIRLINE | DE357 | 9:25 | | PARIS | A01-C18 | 24 | |
| B/AIRLINE | BB221 | 9:45 | | NAGOYA | F01-F18 | 31 | |

FIG. 12

| AIRLINE | FLIGHT AIRLINE NAME | ESTIMATION TIME | CHANGED TIME | DESTINATION | CHECK-IN COUNTER | BOARDING GATE | CHANGED BOARDING GATE |
|---|---|---|---|---|---|---|---|
| A/AIRLINE | AB123 | 8:45 | | TSINGTAO | H19-H26 | 101 | |
| B/AIRLINE | BB432 | 8:55 | | BANGKOK | G25-G36 | 121 | |
| C/AIRLINE | CO001 | 9:00 | 9:15 | HONG KONG | L01-M18 | 25 | 40 |
| D/AIRLINE | DE357 | 9:25 | | PARIS | A01-C18 | 24 | |
| B/AIRLINE | BB221 | 9:45 | | NAGOYA | F01-F18 | 31 | |

AIRPORT ROBOT AND OPERATION METHOD THEREOF

CROSS-REFERENCE TO RELATED PATENT APPLICATIONS

This application is a U.S. National Stage Application under 35 U.S.C. § 371 of PCT Application No. PCT/KR2017/009589, filed Sep. 1, 2017, which claims priority to Korean Patent Application No. 10-2016-0130612, filed Oct. 10, 2016, whose entire disclosures are hereby incorporated by reference.

TECHNICAL FIELD

The present invention relates to a robot disposed at airport and an operating method thereof, and more particularly, to an airport robot which guides airplane boarding to users while moving through a certain path, based on airplane flight information and an operating method of the airport robot.

BACKGROUND ART

Recently, as deep learning technology, self-driving technology, automatic control technology, and Internet of things (IoT) advance, it is possible to implement intelligent robots. Intelligent robots are disposed at public places such as airport, and thus, it is possible to provide users with various information and services.

Each technology will be described below in detail. Deep learning corresponds to the field of machine learning. The deep learning is technology which allows a program to perform similar determination on various situations, instead of a method where a condition and a command are previously set in a program. Therefore, according to the deep learning, computers may think similar to brains of humans and may analyze massive data.

Self-driving is technology where a machine determines and moves autonomously to avoid an obstacle. According to the self-driving technology, a robot autonomously recognizes and moves a position through a sensor to avoid an obstacle.

The automatic control technology denotes technology where a machine feeds back a measurement value, obtained by inspecting a machine state, to a control device to automatically control an operation of the machine. Therefore, control may be performed without manipulation by a user, and control may be automatically performed so that a desired control target reaches a desired range.

IoT denotes intelligent technology and service where all things are connected to one another over Internet and information exchanges between a user and a thing and between a thing and a thing. Devices connected to Internet through IoT transmit or receive information to perform autonomous communication, without the help of a user.

As the above-described technologies advance and are merged, it is possible to implement intelligent robots. Since intelligent robots are disposed at public places such as airport, it is possible to provide users with various information and services.

Airport robots disposed at airport may provide a guidance service while freely moving areas at airport, based on self-driving technology. In detail, airport robots may previously store airplane flight information and may provide pieces of information associated with airplane boarding.

DISCLOSURE

Technical Problem

A first problem of the present invention is directed to providing an airport robot which sets a movement path so as to repeatedly move to positions associated with airplane boarding and transfers airplane boarding information to users while moving along the set path.

A second problem of the present invention is directed to providing an airport robot which receives information, changed in association with airplane boarding, to a server and quickly transfers the changed information to a user.

A third problem of the present invention is directed to providing an airport robot which sets a movement path and a guidance time for transferring airplane boarding information, based on airplane flight information or area-based situation information at airport.

Technical Solution

In order to solve the first problem of the present invention, an airport robot according to the present invention may include a driving driver which repeatedly moves to positions associated with airplane boarding and a display unit which displays airplane boarding information, thereby transferring airplane boarding information to a user at a main position associated with airplane boarding.

In order to solve the second problem of the present invention, an airport robot according to the present invention may further include an application processor (AP) which receives information, changed in association with airplane boarding, from a server, thereby quickly transferring the changed information to a user. Also, the AP may transfer the changed information to the user while repeatedly moving to a before-change boarding position and an after-change boarding position.

In order to solve the third problem of the present invention, the AP may set a movement path and a guidance time, based on one or more of a takeoff estimation time, the number of estimated passengers, and in-airport area-based person complexity.

Advantageous Effects

An airport robot according to an embodiment of the present invention may transfer a boarding position and a boarding time to a user to board an airplane while repeatedly moving to positions associated with airplane boarding. Therefore, an effect where the airport robot helps the user to easily move to the boarding position and to board the airplane on time is obtained.

An airport robot according to an embodiment of the present invention may receive change information associated with airplane boarding from a server and may quickly transfer the received change information to a user. Therefore, an effect where the user may be quickly provided with frequently changed airplane boarding information is obtained.

An airport robot according to an embodiment of the present invention may automatically set a repetition movement path and a guidance time, based on airplane flight information or in-airport area-based situation information. Accordingly, an effect where boarding information may be transferred to users as many as possible is obtained.

DESCRIPTION OF DRAWINGS

FIG. 5 is a diagram illustrating an example of airplane flight information stored in a server according to an embodiment of the present invention.

FIG. 12 is a diagram illustrating changed airplane flight information according to an embodiment of the present invention.

MODE FOR INVENTION

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

Figure 1:
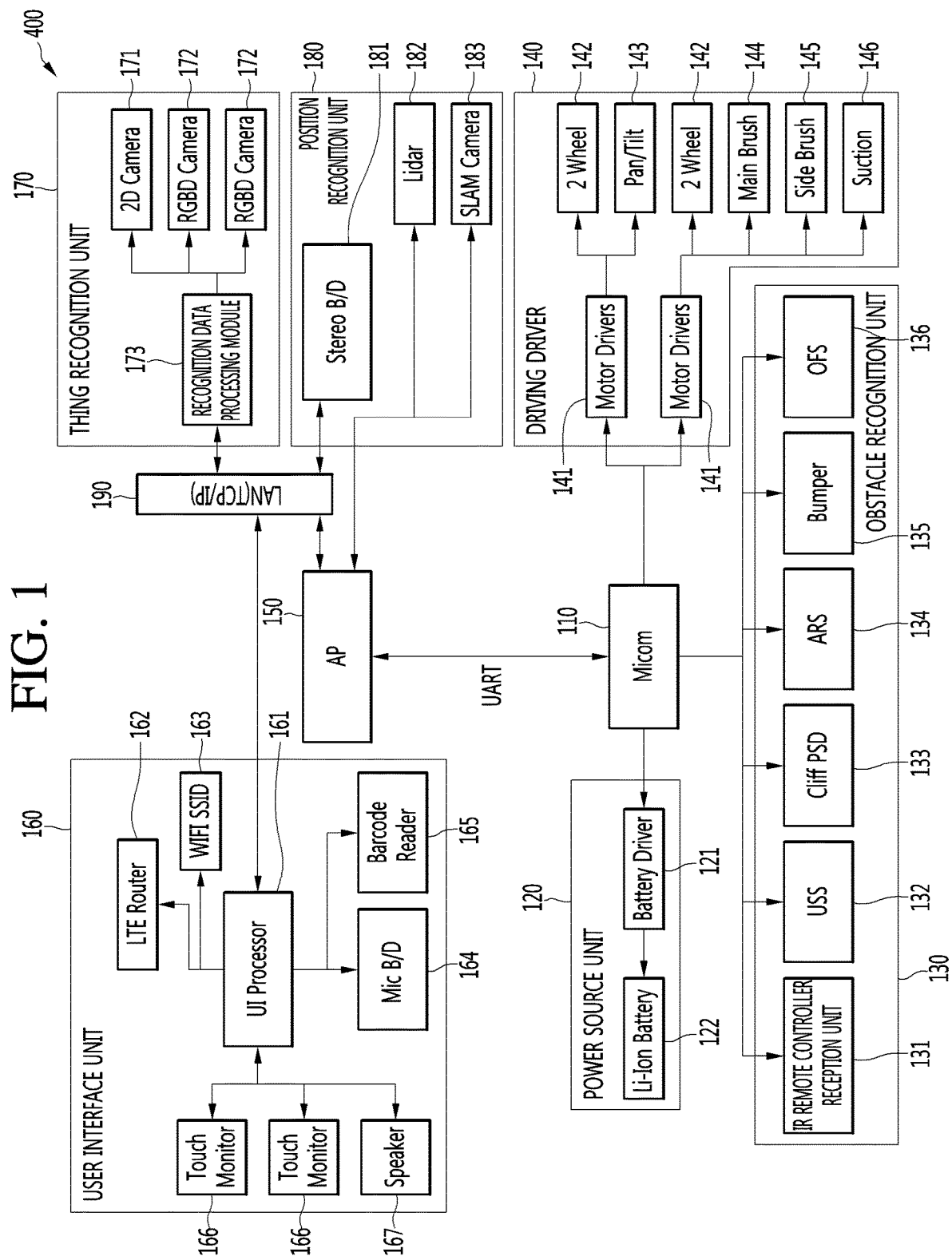
FIG. 1 is a block diagram illustrating a hardware configuration of an airport robot according to an embodiment of the present invention.

FIG. 1 is a block diagram illustrating a hardware configuration of an airport robot according to an embodiment of the present invention.

As illustrated in FIG. 1, hardware of the airport robot according to an embodiment of the present invention may be configured with a microcomputer group and an AP group. The microcomputer group may include a microcomputer 110, a power source unit 120, an obstacle recognition unit 130, and a driving driver 140. The AP group may include an AP 150, a user interface unit 160, a thing recognition unit 170, a position recognition unit 180, and a local area network (LAN) 190.

The microcomputer 110 may manage the power source unit 120 including a battery of the hardware of the airport robot, the obstacle recognition unit 130 including various kinds of sensors, and the driving driver 140 including a plurality of motors and wheels.

The power source unit 120 may include a battery driver 121 and a lithium-ion (li-ion) battery 122. The battery driver 121 may manage charging and discharging of the li-ion battery 122. The li-ion battery 122 may supply power for driving the airport robot. The li-ion battery 122 may be configured by connecting two 24V/102 A li-ion batteries in parallel.

The obstacle recognition unit 130 may include an infrared (IR) remote controller reception unit 131, an ultrasonic sensor (USS) 132, a cliff PSD 133, an attitude reference system (ARS) 134, a bumper 135, and an optical flow sensor (OFS) 136. The IR remote controller reception unit 131 may include a sensor which receives a signal from an IR remote controller for remotely controlling the airport robot. The USS 132 may include a sensor for determining a distance between an obstacle and the airport robot by using an ultrasonic signal. The cliff PSD 133 may include a sensor for sensing a precipice or a cliff within a forward-direction airport robot driving range of 360 degrees. The ARS 134 may include a sensor for detecting a gesture of the airport robot. The ARS 134 may include a sensor which is configured with an acceleration 3-axis and a gyro 3-axis for detecting the number of rotations. The bumper 135 may include a sensor which senses a collision between the airport robot and an obstacle. The sensor included in the bumper 135 may sense a collision between the airport robot and an obstacle within a 360-degree range. The OFS 136 may include a sensor for measuring a phenomenon where a wheel is spinning in driving of the airport robot and a driving distance of the airport robot on various floor surfaces.

The driving driver 140 may include a motor driver 141, a wheel motor 142, a rotation motor 143, a main brush motor 144, a side brush motor 145, and a suction motor 146. The motor driver 141 may perform a function of driving the wheel motor, the brush motor, and suction motor for driving and cleaning of the airport robot. The wheel motor 142 may drive a plurality of wheels for driving of the airport robot. The rotation motor 143 may be driven for a lateral rotation and a vertical rotation of a head unit of the airport robot or a main body of the airport robot, or may be driven the direction change or rotation of a wheel of the airport robot. The main brush motor 144 may drive a brush which sweeps filth on an airport floor. The side brush motor 145 may drive a brush which sweeps filth in a peripheral area of an outer surface of the airport robot. The suction motor 146 may be driven for sucking filth on the airport floor.

The AP (Application Processor) (or processor) 150 may function as a central processing unit which manages a whole hardware module system of the airport robot. The AP 150 may transmit, to the microcomputer 110, user input/output information and application program driving information for driving by using position information obtained through various sensors, thereby allowing a motor or the like to be performed.

The user interface unit 160 may include a user interface (UI) processor 161, a long term evolution (LTE) router 162, a WIFI SSID 163, a microphone board 164, a barcode reader 165, a touch monitor 166, and a speaker 167. The user interface processor 161 may control an operation of the user interface unit which performs an input/output of a user. The LTE router 162 may receive necessary information from the outside and may perform LTE communication for transmitting information to the user. The WIFI SSID 163 may analyze WIFI signal strength to perform position recognition on a specific object or the airport robot. The microphone board 164 may receive a plurality of microphone signals, process a sound signal into sound data which is a digital signal, and analyze a direction of the sound signal and a corresponding sound signal. The barcode reader 165 may read barcode information described in a plurality of targets used in airport. The touch monitor 166 may include a monitor for displaying output information and a touch panel which is configured for receiving the input of the user. The speaker 167 may inform the user of specific information through a voice.

The thing recognition unit 170 may include a two-dimensional (2D) camera 171, a red, green, blue, and distance (RGBD) camera 172, and a recognition data processing module 173. The 2D camera 171 may be a sensor for recognizing a person or an object on the basis of a 2D image. The RGBD camera 172 may be a camera including RGBD sensors or may be a sensor for detecting a person or an object by using captured images including depth data obtained from other similar three-dimensional (3D) imaging devices. The recognition data processing module 173 may process a signal such as 2D image/video or 3D image/video obtained from the 2D camera and the RGBD camera 172 to recognize a person or an object.

The position recognition unit 180 may include a stereo board (B/D) 181, a light detection and ranging (LIDAR) 182, and a simultaneous localization and mapping (SLAM) camera 183. The SLAM camera 183 may implement simultaneous position tracing and mapping technology. The airport robot may detect ambient environment information by suing the SLAM camera 183 and may process obtained information to generate a map corresponding to a duty performing space and simultaneously estimate its absolute position. The LIDAR 182, a laser radar, may be a sensor which irradiates a laser beam and collects and analyzes rearward-scattered light of light absorbed or scattered by aerosol to perform position recognition. The stereo board 181 may process sensing data collected from the LIDAR 182 and the SLAM camera 183 to manage data for recognizing a position of the airport robot and an obstacle.

The LAN 190 may perform communication with the user interface processor 161 associated with a user input/output, the recognition data processing module 173, the stereo board 181, and the AP 150.

Figure 2:
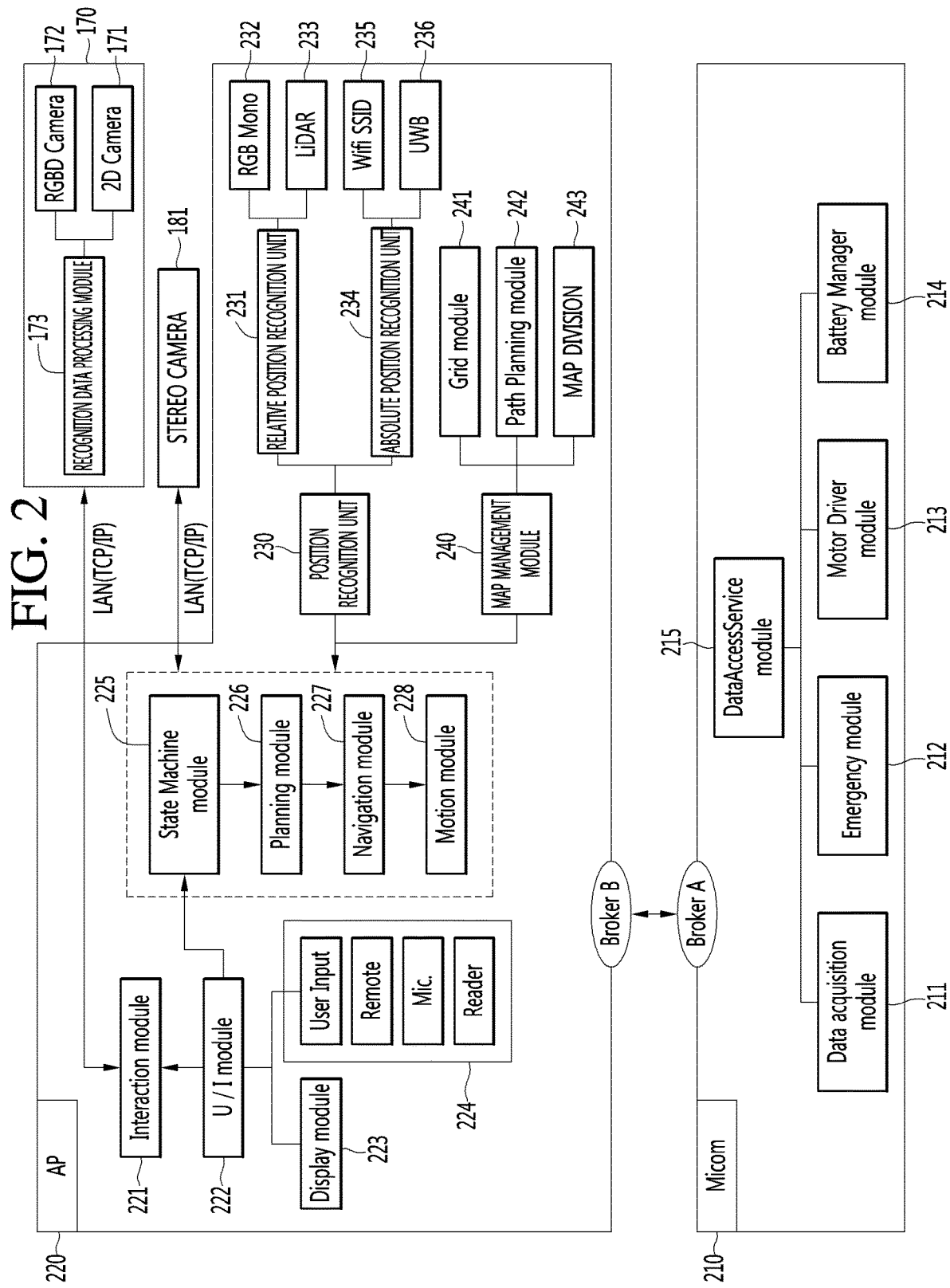
FIG. 2 is a diagram illustrating in detail a configuration of each of a microcomputer and an application processor (AP) of an airport robot according to another embodiment of the present invention.

FIG. 2 is a diagram illustrating in detail a configuration of each of a microcomputer and an AP of an airport robot according to another embodiment of the present invention.

As illustrated in FIG. 2, a microcomputer 210 and an AP 220 may be implemented as various embodiments, for controlling recognition and action of the airport.

For example, the microcomputer 210 may include a data access service module 215. The data access service module 215 may include a data acquisition module 211, an emergency module 212, a motor driver module 213, and a battery manager module 214. The data acquisition module 211 may acquire data sensed from a plurality of sensors included in the airport robot and may transfer the acquired data to the data access service module 215. The emergency module 212 may be a module for sensing an abnormal state of the airport robot, and when the airport robot performs a predetermined type action, the emergency module 212 may sense that the airport robot is in the abnormal state. The motor driver module 213 may manage a wheel, a brush, and driving control of a suction motor for driving and cleaning of the airport robot. The battery manager module 214 may manage charging and discharging of the li-ion battery 122 of FIG. 1 and may transfer a battery state of the airport robot to the data access service module 215.

The AP 220 may receive, recognize, and process a user input and the like to control an operation of the airport robot with various cameras and sensors. An interaction module 221 may be a module which synthesizes recognition data received from the recognition data processing module 173 and a user input received from a user interface module 222 to manage software exchanged between a user and the airport robot. The user interface module 222 may receive a close-distance command of the user such as a key, a touch screen, a reader, and a display unit (or display) 223 which is a monitor for providing manipulation/information and a current situation of the airport robot, or may receive a long-distance signal such as a signal of an IR remote controller for remotely controlling the airport robot, or may manage a user input received of a user input unit 224 receiving an input signal of the user from a microphone, a barcode reader, or the like. When one or more user inputs are received, the user interface module 222 may transfer user input information to a state machine module 225. The state machine module 225 which has received the user input information may manage a whole state of the airport robot and may issue an appropriate command corresponding to a user input. A planning module 226 may determine a start time and an end time/action for a specific operation of the airport robot according to the command transferred from the state machine module 225 and may calculate a path through which the airport will move. A navigation module 227 may be a module which manages overall driving of the airport robot and may allow the airport robot to drive along a driving path calculated by the planning module 226. A motion module 228 may allow the airport robot to perform a basic operation in addition to driving.

Moreover, the airport robot according to another embodiment of the present invention may include a position recognition unit 230. The position recognition unit 230 may include a relative position recognition unit 231 and an absolute position recognition unit 234. The relative position recognition unit 231 may correct a movement amount of the airport robot through an RGM mono sensor 232, calculate a movement amount of the airport robot for a certain time, and recognize an ambient environment of the airport robot through a LIDAR 233. The absolute position recognition unit 234 may include a WIFI SSID 235 and a UWB 236. The WIFI SSID 235 may be an UWB sensor module for recognizing an absolute position of the airport robot and may be a WIFI module for estimating a current position through WIFI SSID sensing. The WIFI SSID 235 may analyze WIFI signal strength to recognize a position of the airport robot. The UWB 236 may calculate a distance between a transmission unit and a reception unit to sense the absolute position of the airport robot.

Moreover, the airport robot according to another embodiment of the present invention may include a map management module 240. The map management module 240 may include a grid module 241, a path planning module 242, and a map division module 243. The grid module 241 may manage a lattice type map generated by the airport robot through an SLAM camera or map data of an ambient environment, previously input to the airport robot, for position recognition. In map division for cooperation between a plurality of airport robots, the path planning module 242 may calculate driving paths of the airport robots. Also, the path planning module 242 may calculate a driving path through which the airport robot will move. Also, the path planning module 242 may calculate a driving path through which the airport robot will move in an environment where one airport robot operates. The map division module 243 may calculate in real time an area which is to be managed by each of a plurality of airport robots.

Pieces of data sensed and calculated from the position recognition unit 230 and the map management module 240 may be again transferred to the state machine module 225. The state machine module 225 may issue a command to the planning module 226 so as to control an operation of the airport robot, based on the pieces of data sensed and calculated from the position recognition unit 230 and the map management module 240.

Figure 3:
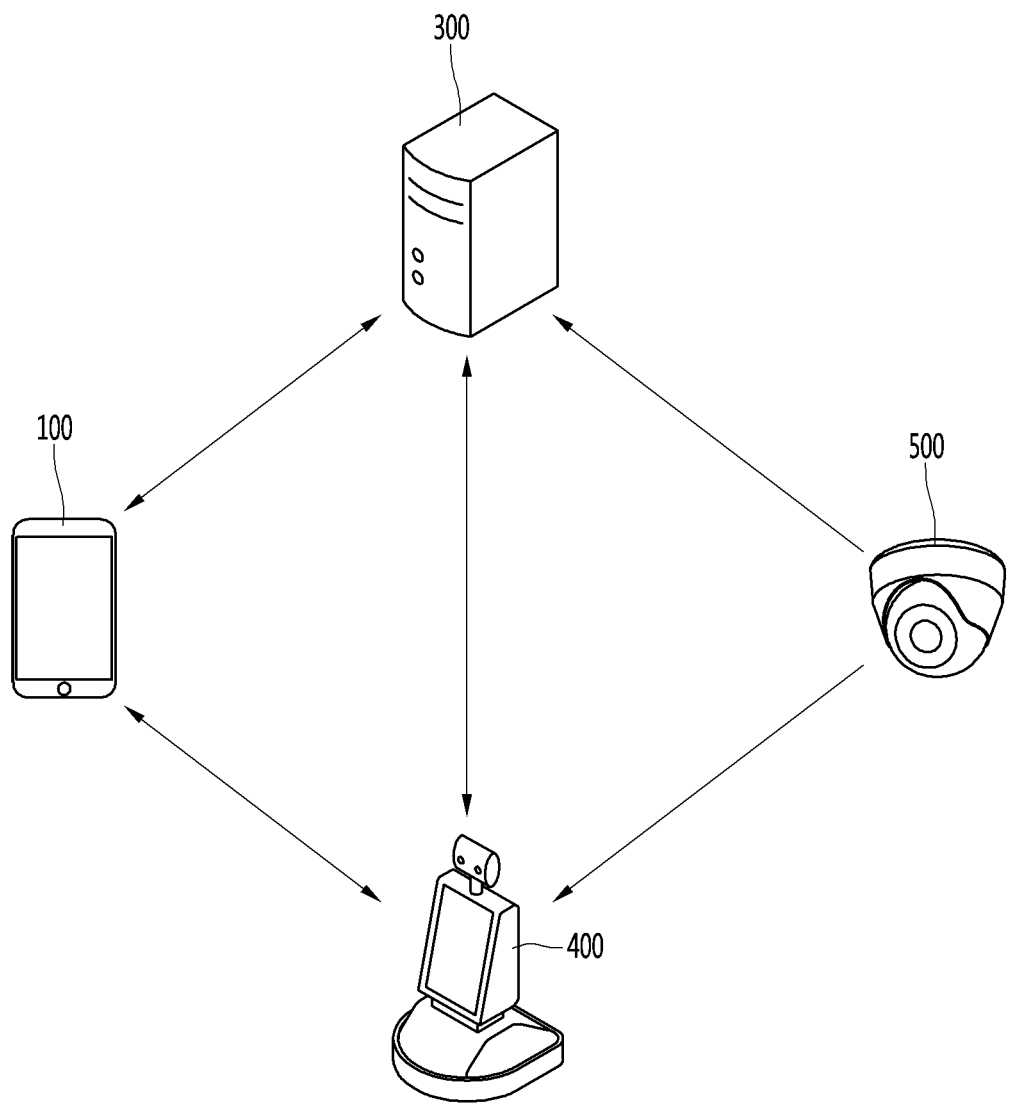
FIG. 3 is a diagram illustrating the structure of an airport robot system according to an embodiment of the present invention.

FIG. 3 is a diagram illustrating the structure of an airport robot system according to an embodiment of the present invention.

The airport robot system according to the embodiment of the present invention may include a mobile terminal 100, a server (or computer) 300, an airport robot 400 and a camera 500.

The mobile terminal 100 may transmit and receive data to and from the server 300 in the airport. For example, the mobile terminal 100 may receive airport related data such as a flight time schedule, an airport map, etc. from the server 300. A user may receive necessary information of the airport from the server 300 through the mobile terminal 100. In addition, the mobile terminal 100 may transmit data such as a photo, a moving image, a message, etc. to the server 300. For example, the user may transmit the photograph of a missing child to the server 300 to report the missing child or photograph an area of the airport where cleaning is required through the camera 121 to request cleaning of the area.

In addition, the mobile terminal 100 may transmit and receive data to and from the airport robot 400.

For example, the mobile terminal 100 may transmit, to the airport robot 400, a signal for calling the airport robot 400, a signal for instructing that specific operation is performed, or an information request signal. The airport robot 400 may move to the position of the mobile terminal 100 or perform operation corresponding to the instruction signal in response to the call signal received from the mobile terminal 100. Alternatively, the airport robot 400 may transmit data corresponding to the information request signal to the mobile terminal 100 of the user.

Next, the airport robot 400 may perform patrol, guidance, cleaning, disinfection and transportation within the airport.

The airport robot 400 may transmit and receive signals to and from the mobile terminal 100 or the server 300. For example, the airport robot 400 may transmit and receive signals including information on the situation of the airport to and from the server 300. In addition, the airport robot 400 may receive image information of the areas of the airport from the camera 500 in the airport. Accordingly, the airport robot 400 may monitor the situation of the airport through the image information captured by the airport robot 400 and the image information received from the camera 500.

The airport robot 400 may directly receive a command from the user. For example, a command may be directly received from the user through input of touching the display unit provided in the airport robot 400 or voice input. The airport robot 400 may perform patrol, guidance, cleaning, etc. according to the command received from the user, the mobile terminal 100 or the server 300.

Next, the server 300 may receive information from the mobile terminal 100, the airport robot 400 and the camera 500. The server 300 may collect, store and manage the information received from the devices. The server 300 may transmit the stored information to the mobile terminal 100 or the airport robot 400. In addition, the server 300 may transmit command signals to a plurality of the airport robots 400 disposed in the airport.

The camera 500 may include a camera installed in the airport. For example, the camera 500 may include a plurality of closed circuit television (CCTV) cameras installed in the airport, an infrared thermal-sensing camera, etc. The camera 500 may transmit the captured image to the server 300 or the airport robot 400.

Figure 4:
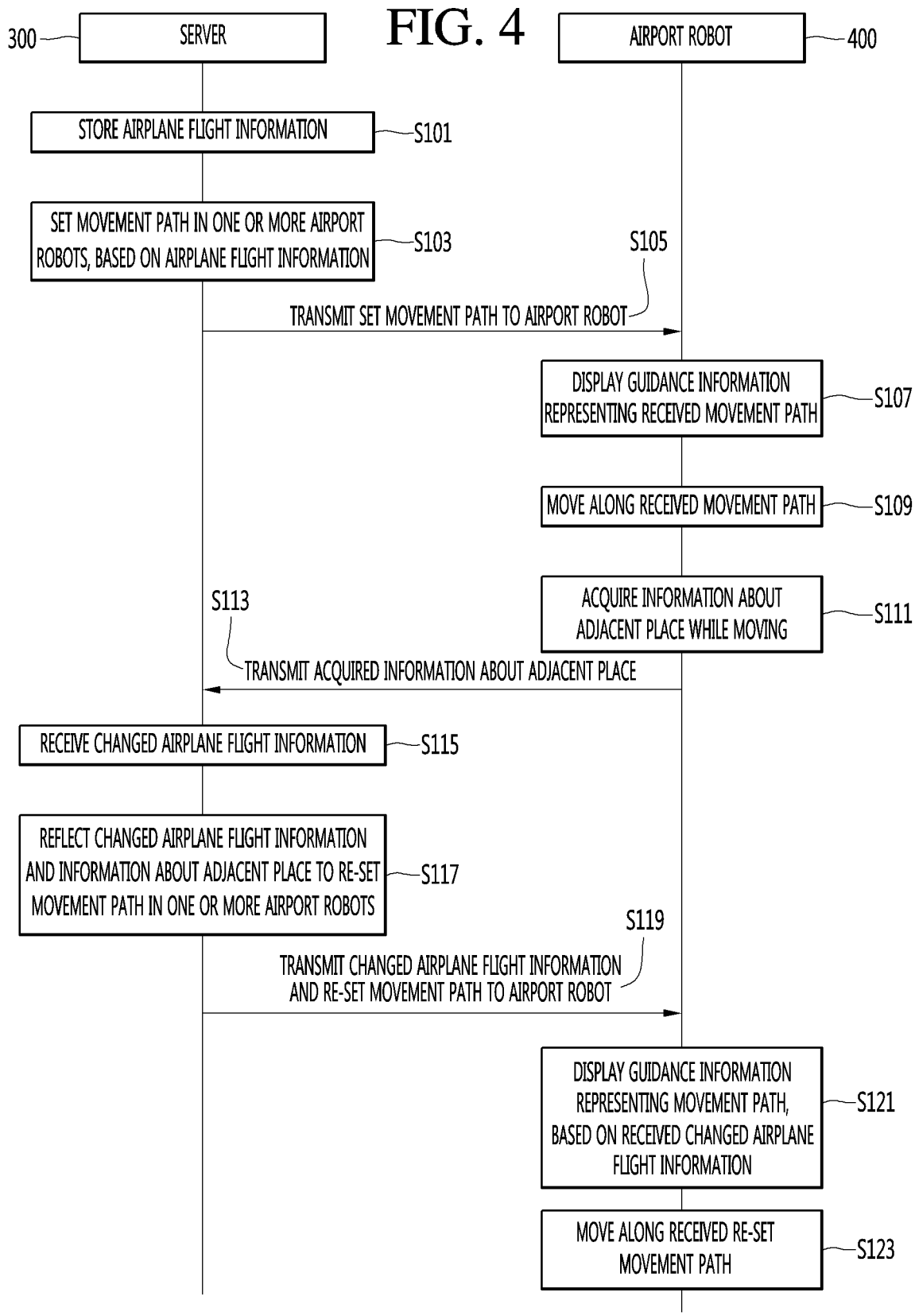
FIG. 4 is a ladder diagram for illustrating an operating method between a server and an airport robot according to an embodiment of the present invention.

Next, FIG. 4 is a ladder diagram for illustrating an operating method between a server and an airport robot according to an embodiment of the present invention.

First, the server 300 may store airplane flight information (S101).

The server 300 may receive the airplane flight information from the outside and may store the airplane flight information. Alternatively, the airplane flight information may be input to and stored in the server 300.

The airplane flight information may denote pieces of information associated with an airplane which takes off from/lands at airport. For example, the airplane flight information may include information such as airline information, flight airlines, takeoff or landing estimation times, changed times, destinations, check-in counter positions, boarding gates, and changed boarding gates of airplanes taking off/landing at airport.

Next, FIG. 5 is a diagram illustrating an example of airplane flight information stored in a server according to an embodiment of the present invention. The server 300 may store flight information about takeoff estimation airplanes as illustrated in FIG. 5. In detail, the server 300 may store one or more of airline information (or airline name), flight airline names (or flight identifier), takeoff estimation times, changed takeoff estimation times, destinations, check-in counter positions, boarding gates, and changed boarding gate information of airplanes estimated to take off.

Each of pieces of information will be described below in detail. Airline information may denote an airline name of a flight-estimated airplane. For example, an airline may represent information such as an A airline, a B airline, a C airline, or a D airline.

A flight airline name (or flight identifier or flight code) may generally include a number representing an airline code and a destination. For example, the flight airline name may represent information such as AB123, BB432, C0001, DE357, or BB221.

An estimation time may denote a pre-estimated airplane takeoff/landing time. For example, the estimation time may be time information such as 8:45, 8:55, 9:00, 9:10, or 9:40. The estimation time may be the same or differ for each flight airline name.

A changed time may denote a pre-estimated airplane takeoff/landing time and a differently changed takeoff/landing time. Therefore, the changed time may include time information such as an estimation time. The changed time may include time information or not, based on that an airplane estimation time is changed or not.

A destination may denote an arrival destination of each flight airline name. For example, a destination may be city information about each country like Tsingtao, Bangkok, Hong Kong, Paris, or Nagoya. Unlike the illustration of FIG. 5, when the server 300 includes flight information about a landing-estimated airplane, the server 300 may include departure point information instead of destination information.

A check-in counter may denote a place which is to be visited for getting a boarding pass for airplane boarding or for sending luggage. For example, the check-in counter may represent information such as H19-H26, G25-G36, L01-M18, A01-C18, or F01-F18.

A boarding gate may denote a position to which a user will move for boarding an airplane to take off. For example, the boarding gate may be number data like 101, 121, 25, 24, or 31.

A changed boarding gate may denote a boarding gate which is changed due to a delay of an airplane to take off or the other causes. The changed boarding gate may be number data like the boarding gate. Changed boarding gate information may be provided or not depending on the case.

Unlike the illustration of FIG. 5, when the server 300 includes flight information about a landing-estimated airplane, the server 300 may not include check-in counter information, boarding gate information, or changed boarding gate information. Also, a method of storing information may differ from an example illustrated in FIG. 5.

Airplane flight information described above with reference to FIG. 5 is merely an embodiment, and thus, some of pieces of information may be omitted or other information may be further added. For example, the airplane flight information may further include information about the number of estimation boarding persons for each airplane.

FIG. 4 will be described again.

The server 300 may set a movement path in one or more airport robots 400 on the basis of airplane flight information (S103).

The server 300 may set a path, through which persons move to positions needed for boarding, in the airport robot 400 in order for the persons to conveniently find a boarding gate at airport. The server 300 may set the movement path on the basis of the airplane flight information, for helping persons currently located at airport to board an airplane to use. Therefore, a method of providing persons to airplane flight information or helping the persons to board an airplane on time may be provided.

The server 300 may store an airport map, for setting the movement path in the airport robot 400.

Figure 6:
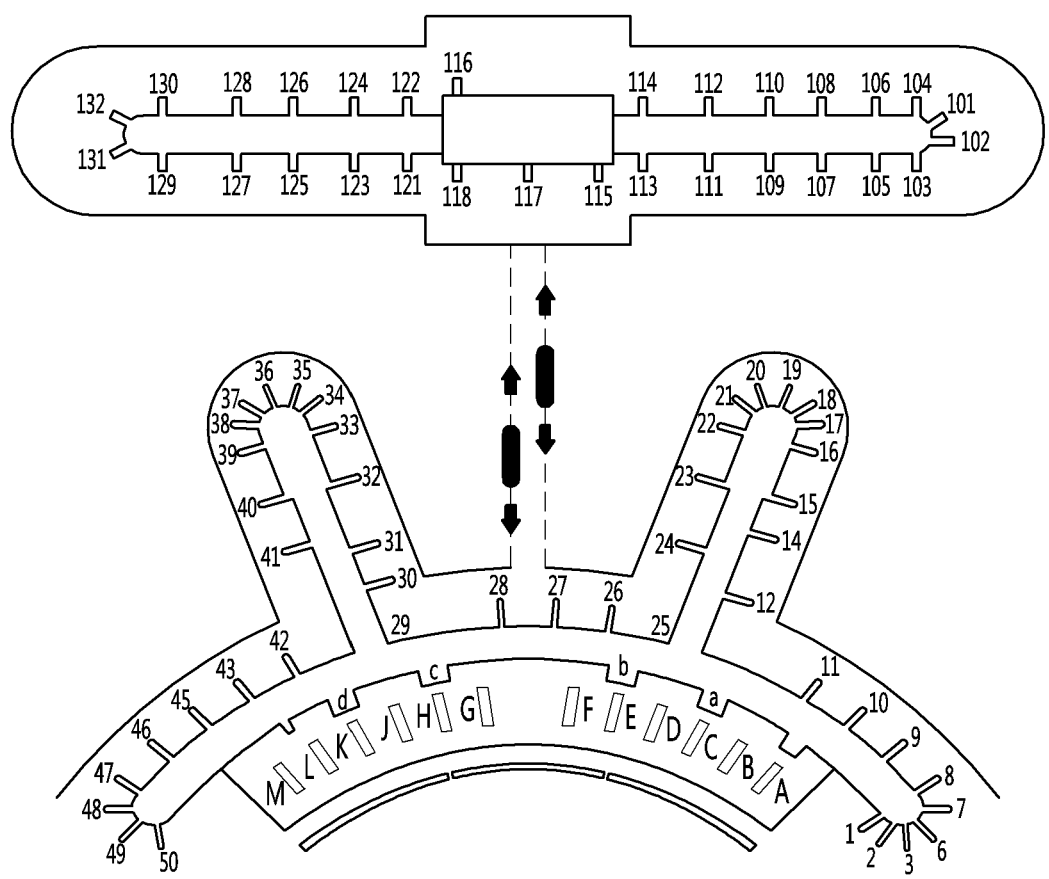
FIG. 6 is a diagram illustrating an example of an airport map stored in a server according to an embodiment of the present invention.

FIG. 6 is a diagram illustrating an example of an airport map stored in a server according to an embodiment of the present invention.

The server 300 may store an airport map including pieces of main position information about airport. In detail, the server 300 may store the airport map including a position of a check-in counter, a position of an immigration checkpoint, a position of a boarding gate, etc.

For example, as illustrated in FIG. 6, the server 300 may store the airport map which includes positions of check-in counters illustrated by 'A' to 'M', positions of immigration checkpoints illustrated by 'a' to 'd', and positions of boarding gates illustrated by '1' to '132'.

Moreover, the server 300 may store various path information which enable persons to move to main positions. For example, as illustrated in FIG. 6, the server 300 may store path information for passing through 'a' to 'd' in order for persons to move from a check-in counter to a boarding gate. Alternatively, the server 300 may store path information using a specific movement means for moving to the boarding gates '101' to '132'. The airport map illustrated in FIG. 6 is merely an example provided for describing the invention and is not limited thereto.

The server 300 may set a movement path, through which persons repeatedly move to boarding positions for each airplane, in the airport robot 400 on the basis of the stored airport map and airplane flight information. Simultaneously, the airport robot 400 may provide boarding information while moving to a designated position. As a result, persons may conveniently use airport and may enable persons to easily board an airplane.

According to an embodiment of the present invention, the server 300 may variously set a movement path of the airport robot 400. A method of setting, by the server 300 according to an embodiment of the present invention, a movement path in the airport robot 400 will be described with reference to FIGS. 7A to 7E.

FIGS. 7A to 7E are diagrams for describing a method of setting, by a server, a movement path in an airport robot according to an embodiment of the present invention. In detail, each of FIGS. 7A to 7E is an exemplary diagram of a movement path set in the airport robot 400 according to the airplane flight information illustrated in FIG. 5.

Figure 7A:
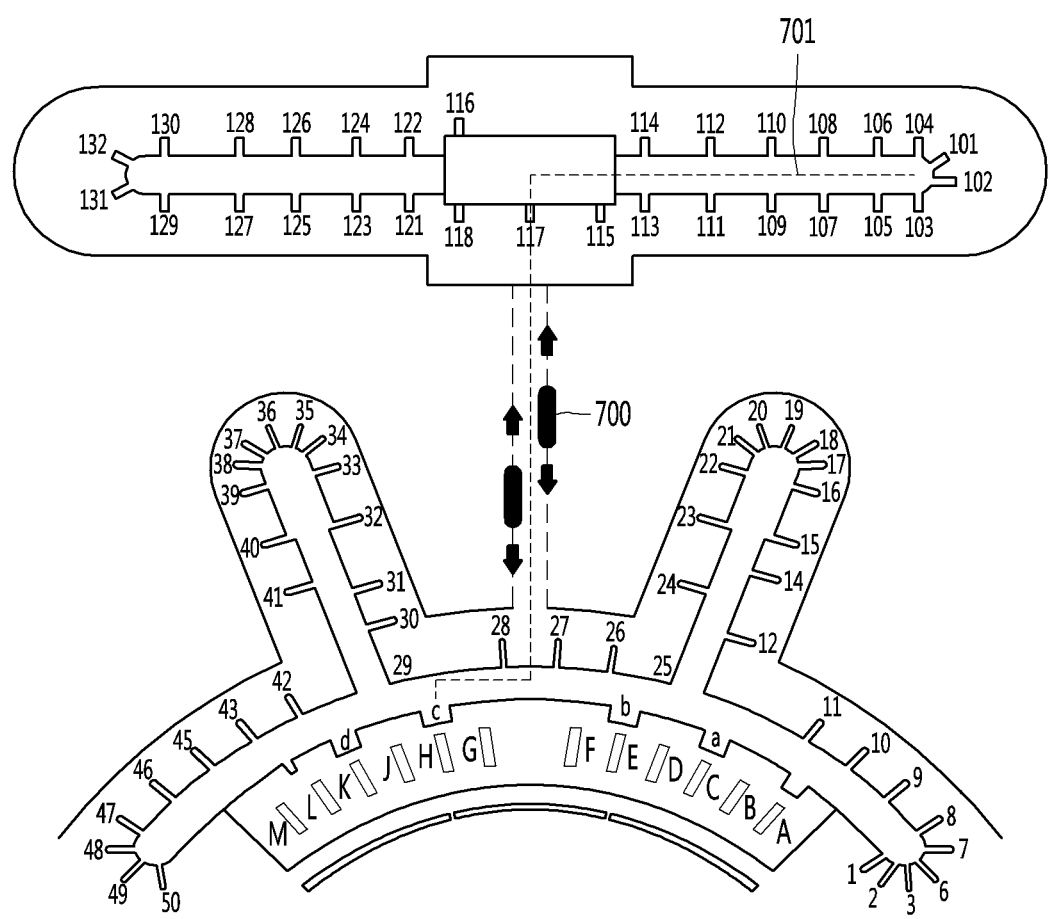
FIGS. 7A to 7E are diagrams for describing a method of setting, by a server, a movement path in an airport robot according to an embodiment of the present invention.

FIG. 7A is a movement path which is set in the airport robot 400 so as to help passengers of a flight airline name AB123 illustrated in FIG. 5. According to the illustration of FIG. 5, a check-in counter of the flight airline name AB123 is H19-H26, and a boarding gate is 101. Therefore, the server 300 may set a movement path from 'c', which is an immigration checkpoint close to the check-in counter H19-H26, to the boarding gate 101. The server 300 may set a movement path 701, through which the airport robot 400 shuttles for a predetermined time, in the airport robot 400.

According to an embodiment of the present invention, the server 300 may set the movement path through which one airport robot 400 shuttles.

According to another embodiment of the present invention, the server 300 may set the movement path 701 in order for a plurality of airport robots 400 to shuttle through the movement path 701 in a special case. The special case may be as follow. For example, as illustrated in FIG. 7A, the special case may be a case where another specific movement means (for example, a shuttle train 700) is provided on the movement path 701. Alternatively, the special case may be a case where a position difficult for the airport robot 400 to move is included in the movement path 701. It may be set that the plurality of airport robots 400 move by dividing the movement path 701.

Figure 7B:
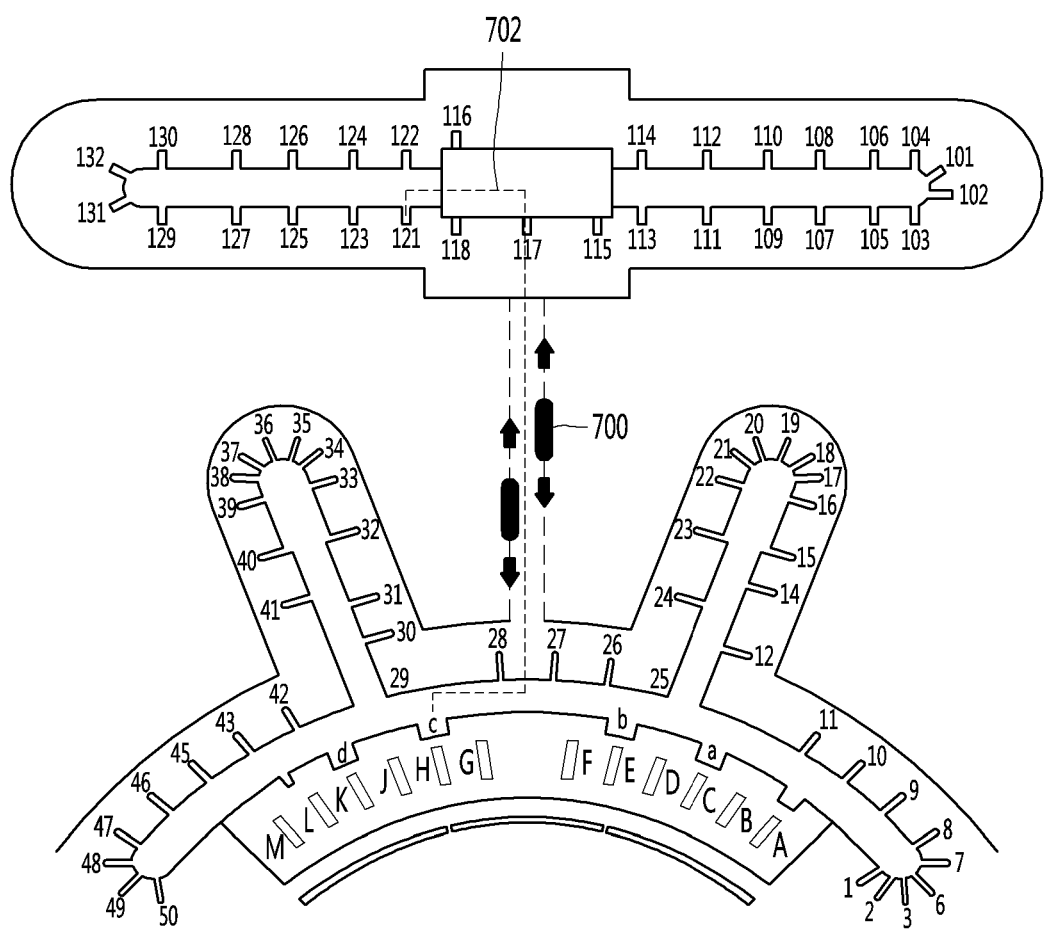

FIG. 7B is a movement path which is set in the airport robot 400 so as to help passengers of a flight airline name BB432 illustrated in FIG. 5. According to the illustration of FIG. 5, a check-in counter of the flight airline name BB432 is G35-G36, and a boarding gate is 121. Therefore, the server 300 may set a movement path 702 from 'c', which is an immigration checkpoint close to the check-in counter G35-G36, to the boarding gate 121. The server 300 may shuttle through the set movement path 702 for a predetermined time.

Figure 7C:
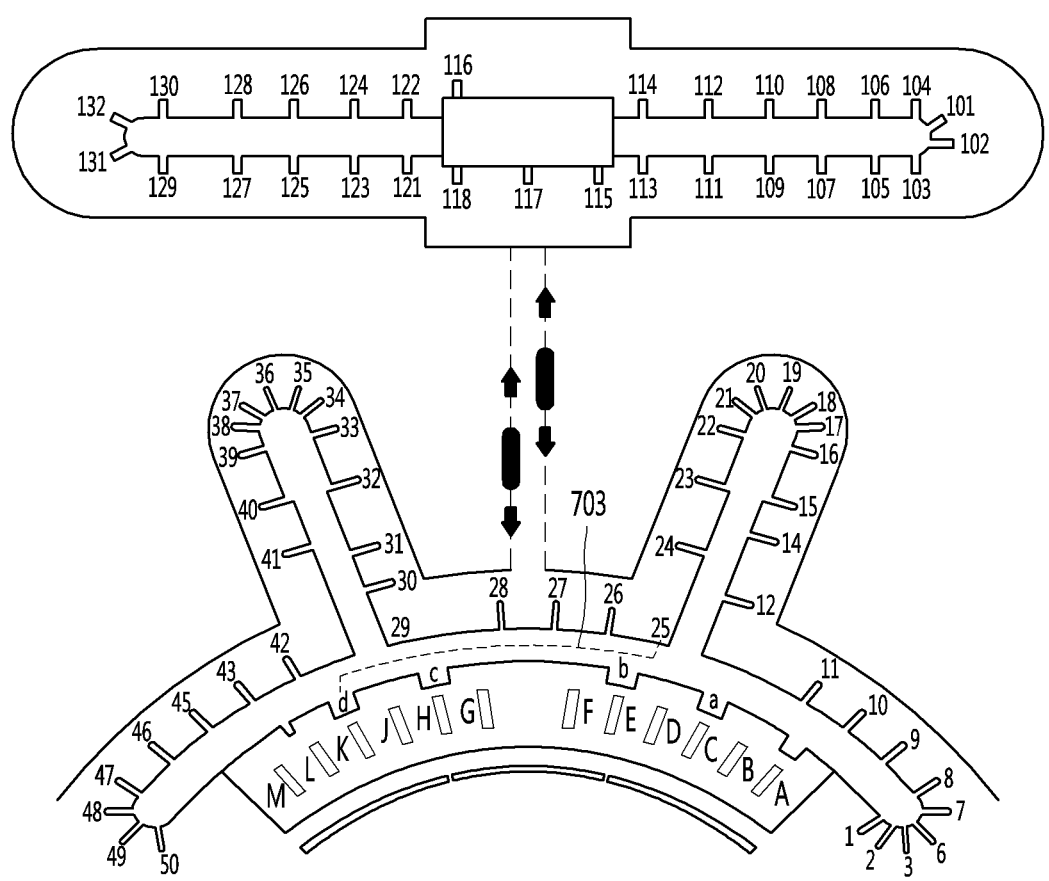

FIG. 7C is a movement path which is set in the airport robot 400 so as to help passengers of a flight airline name C0001 illustrated in FIG. 5. According to the illustration of FIG. 5, a check-in counter of the flight airline name C0001 is L01-M18, and a boarding gate is 25. Therefore, the server 300 may set a movement path 703 from 'd', which is an immigration checkpoint close to the check-in counter L01-M18, to the boarding gate 25. The server 300 may shuttle through the set movement path 703 for a predetermined time.

Figure 7D:
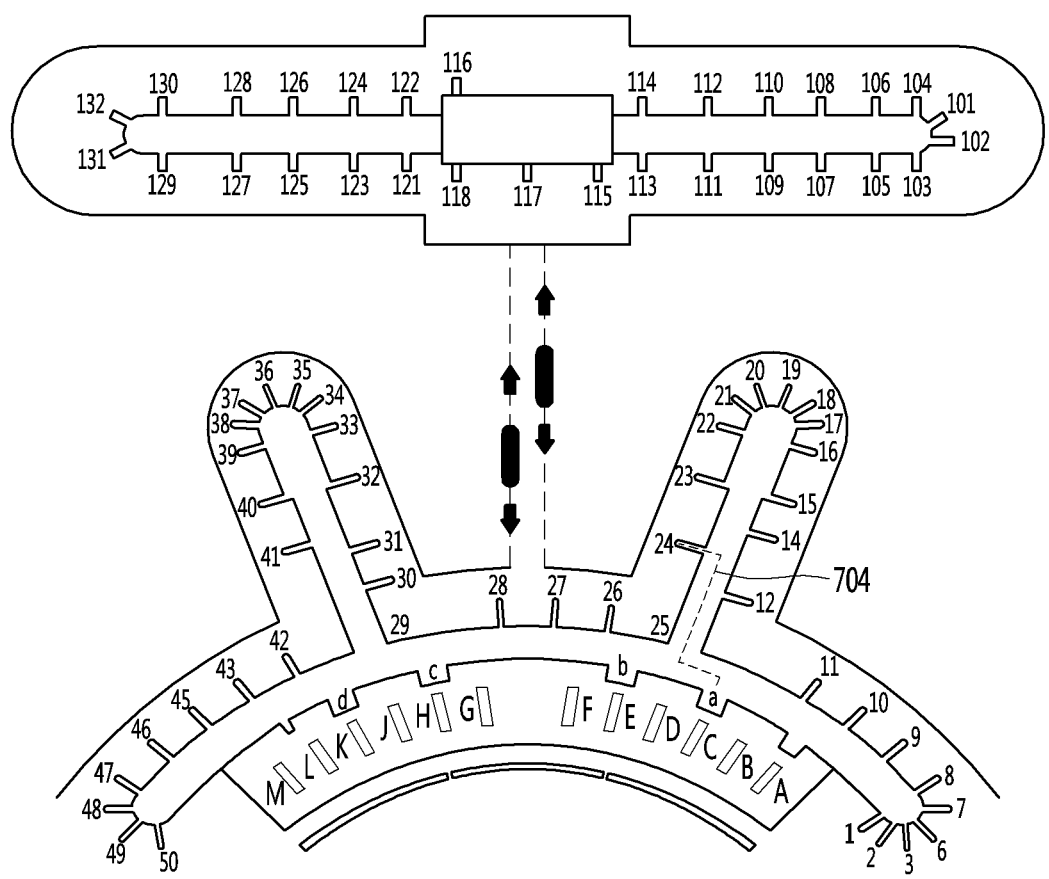

FIG. 7D is a movement path which is set in the airport robot 400 so as to help passengers of a flight airline name DE357 illustrated in FIG. 5. According to the illustration of FIG. 5, a check-in counter of the flight airline name DE357 is A01-C18, and a boarding gate is 24. Therefore, the server 300 may set a movement path 704 from 'a', which is an immigration checkpoint close to the check-in counter A01-C18, to the boarding gate 24. The server 300 may shuttle through the set movement path 704 for a predetermined time.

Figure 7E:
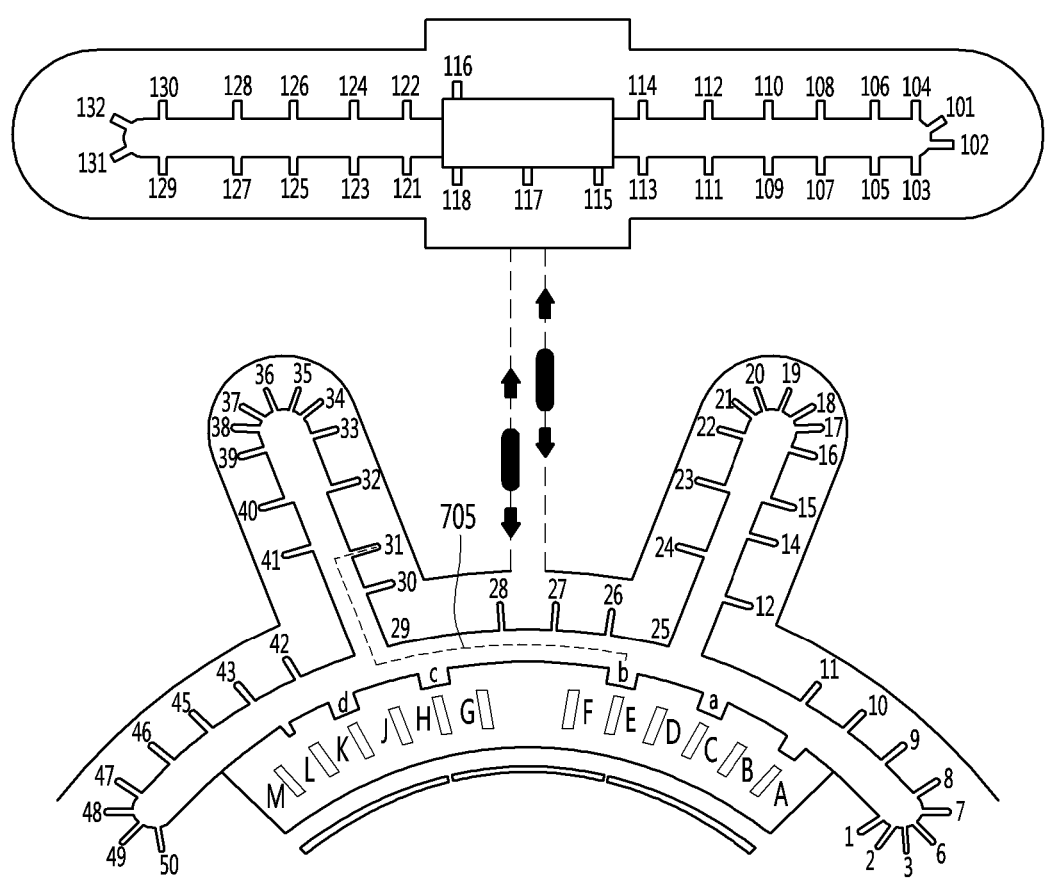

FIG. 7E is a movement path which is set in the airport robot 400 so as to help passengers of a flight airline name BB221 illustrated in FIG. 5. According to the illustration of FIG. 5, a check-in counter of the flight airline name BB221 is F01-F18, and a boarding gate is 31. Therefore, the server 300 may set a movement path 705 from 'b', which is an immigration checkpoint close to the check-in counter F01-F18, to the boarding gate 31. The server 300 may shuttle through the set movement path 705 for a predetermined time.

Next, a method of designating, by the server 300 according to an embodiment of the present invention, a time when the airport robot 400 moves through a movement path will be described.

According to an embodiment of the present invention, the server 300 may set a movement time with respect to each airplane departure estimation time for each flight airplane. In detail, the server 300 may set the movement path through which the airport robot 400 moves for a specific time from before a predetermined time from an airplane departure estimation time. In this manner, the server 300 may set a movement time in the airport robot 400 along with the movement path.

For example, the server 300 may set the movement path in the airport robot 400 so that the airport robot 400 moves to designated positions for 30 minutes from before 40 minutes with respect to each airplane departure estimation time for each flight airplane. That is, the server 300 may set a first movement path 701 in order for a first airport robot 400 to move at 8:05-8:35, set a second movement path 702 in order for a second airport robot 400 to move at 8:15-8:45, set a third movement path 703 in order for a third airport robot 400 to move at 8:20-8:50, set a fourth movement path 704 in order for a fourth airport robot 400 to move at 8:45-9:15, and set a fifth movement path 705 in order for a fifth airport robot 400 to move at 9:05-9:35. In this manner, according to an embodiment of the present invention, the server 300 may perform a setting so that one or more airport robots 400 move through set paths, based on movement times of the one or more airport robots 400.

According to an embodiment of the present invention, the server 300 may set a movement time in the airport robot 400 on the basis of information about the number of passengers estimated to board an airplane. In detail, when the number of passengers estimated to board an airplane is equal to or greater than a reference number, the server 300 may set a movement time to a predetermined time or more. When the number of passengers estimated to board an airplane is less than the reference number, the server 300 may set a movement time to a time which is shorter than the predetermined time. This is because, as the number of passengers increases, more information should be provided to the passengers.

For example, when the number of passengers estimated to board an airplane is 100 or more, the server 300 may perform a setting so that the airport robot 400 moves through a movement path for 50 minutes from one hour before a departure estimation time. Alternatively, when the number of passengers estimated to board an airplane is less than 100, the server 300 may perform a setting so that the airport robot 400 moves through the movement path for 20 minutes from 40 minutes before the departure estimation time.

According to another embodiment of the present invention, the server 300 may set a movement time of the airport robot 400, based on an airplane departure estimation time. In detail, the server 300 may store a time when airport is congested and a time when airport is not congested. For example, a time when airport is congested may denote a time when there are many departure estimation airplanes, and a time when airport is not congested may denote a time when the number of departure estimation airplanes is small.

Therefore, the server 300 may first determine whether an airplane departure estimation time is within a congested time zone or a non-congested time zone. The server 300 may set a movement time of the airport robot 400, based on a result of the determination.

For example, when it is determined that the airplane departure estimation time is within 08:00-12:00 corresponding to the congested time zone, the server 300 may perform a setting so that the airport robot 400 moves from one hour before the departure estimation time. On the other hand, when it is determined that the airplane departure estimation time is within 22:00-24:00 corresponding to the non-congested time zone, the server 300 may perform a setting so that the airport robot 400 moves from 30 minutes before the departure estimation time. A time when airport is congested and a time when airport is not congested may be classified into two or more steps, and thus, a movement time of the airport robot 400 may be variously set.

A time when the airport robot 400 starts to move at a designated position and a total time taken in movement are merely examples for helping understanding and are not limited thereto.

FIG. 4 will be described again.

The server 300 may transmit a set movement path to the airport robot 400 (S105).

The airport robot 400 may receive the movement path from the server 300. The AP 150 of the airport 400 may set the received movement path as a movement path to drive.

The airport robot 400 may display guidance information representing the received movement path (S107).

The AP 150 of the airport robot 400 may control the display unit 223 to display the guidance information representing the received movement path. Alternatively, the AP 150 of the airport robot 400 may control the speaker 167 to output, as a voice, the guidance information representing the received movement path. In this manner, the airport robot 400 may output the movement path by using various manners, thereby providing airplane boarding information, a boarding path, etc.

Figure 8:
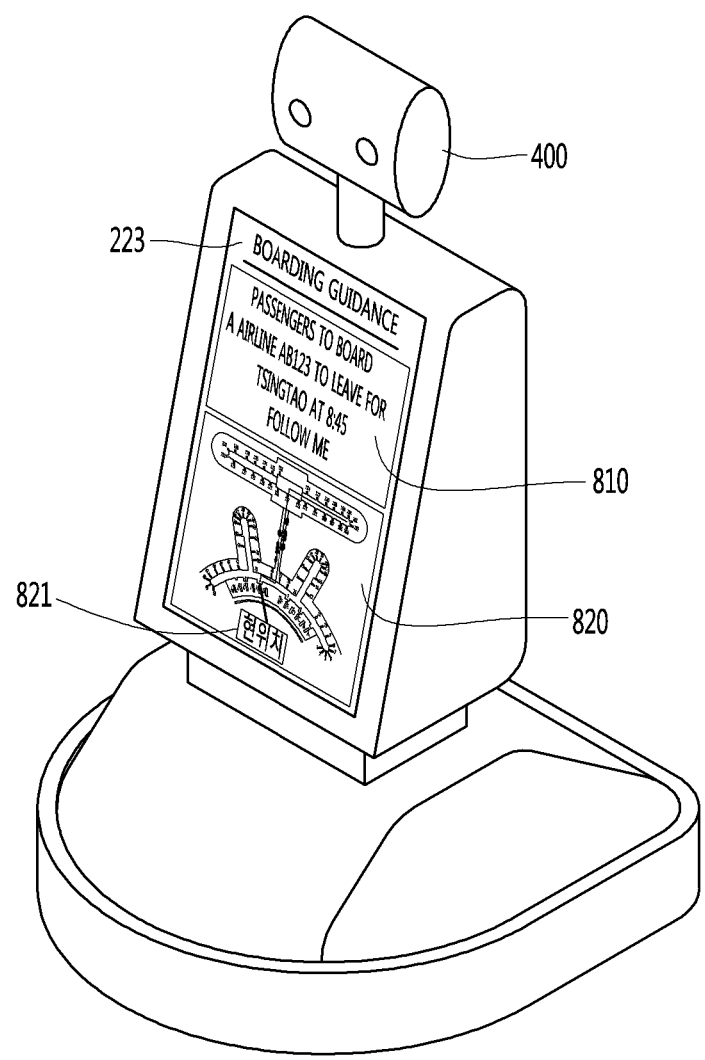
FIG. 8 is a diagram for describing an example where an airport robot according to an embodiment of the present invention displays guidance information, representing a movement path, on a display unit for boarding guidance.

Next, FIG. 8 is a diagram for describing an example where an airport robot according to an embodiment of the present invention displays guidance information, representing a movement path, on a display unit for boarding guidance.

The AP 150 of the airport robot 400 may control the display unit 223 to display the guidance information representing the received movement path as illustrated in FIG. 8. The guidance information may include flight airline information 810 which is currently being guided and a movement path map 820.

The flight airline information 810 includes flight information about an airplane corresponding to a path through which the airport robot 400 moves currently. In detail, the flight airline information 810 includes an airline, a flight airline name, a departure estimation time, and a destination of an airplane corresponding to a current movement path.

For example, as illustrated in FIG. 8, the AP 150 of the airport robot 400 may display the display unit 223 to display a message "passengers to board A airline AB123 to leave for Tsingtao at 8:45 follow me". Therefore, there is an effect where persons may be check whether a path guided by the airport robot 400 is a path for an airplane to board. There is an effect where persons may know that the persons may board an airplane on time when following the airport robot 400 with reference to the flight airline information 810 displayed by the airport robot 400.

The movement path map 820 represents a path through which the airport robot 400 is shuttling currently. The movement path map 820 may further include a current position mark 821. The current position mark 821 may represent a current position of the airport robot 400. Therefore, the movement path map 820 may simultaneously display a current position of the airport robot 400 and a path through which the airport robot 400 is moving currently. Persons may know how to move for boarding an airplane with reference to the movement path map 820. Accordingly, there is an effect where persons may determine whether to follow the airport robot 400 or to move with reference to the movement path map 820.

FIG. 4 will be described again.

The AP 150 of the airport robot 400 may move along the received movement path (S109).

The AP 150 of the airport robot 400 may control the driving driver 140 in order for the airport robot 400 to move along the movement path received from the server 300 for a predetermined time. The airport robot 400 may shuttle through the received movement path for a predetermined time, thereby helping users to board an airplane. The users may check a way with reference to guidance information displayed by the display unit 223 of the airport robot 400 which is moving, or may get way guidance by following the airport robot 400.

Figure 9:
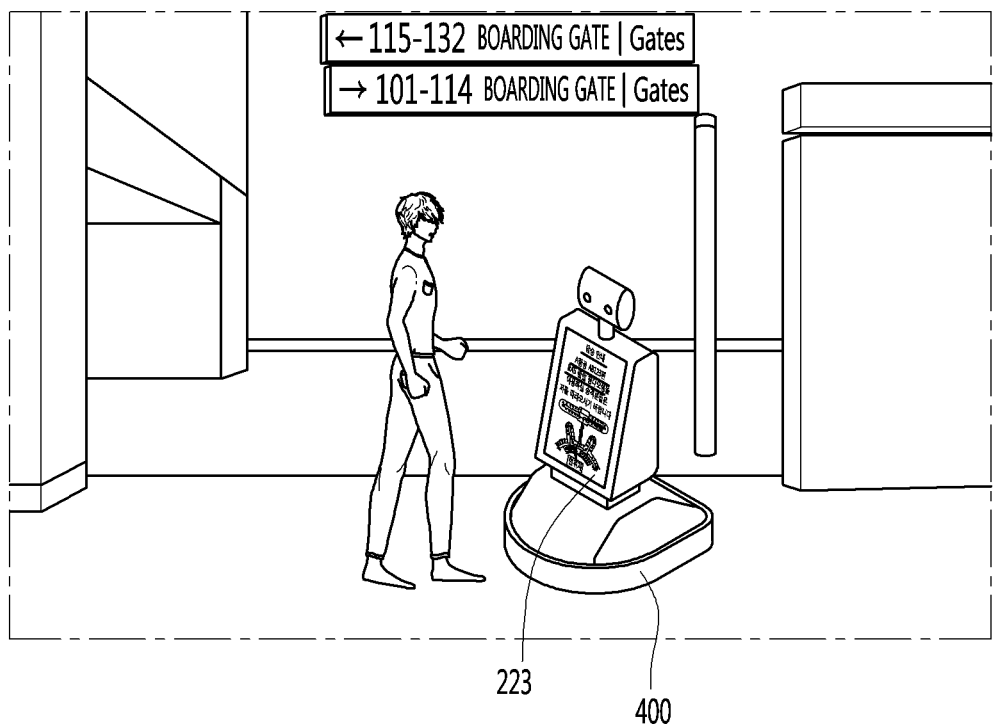
FIGS. 9 and 10 are diagrams for describing a gesture of an airport robot according to an embodiment of the present invention.
Figure 10:
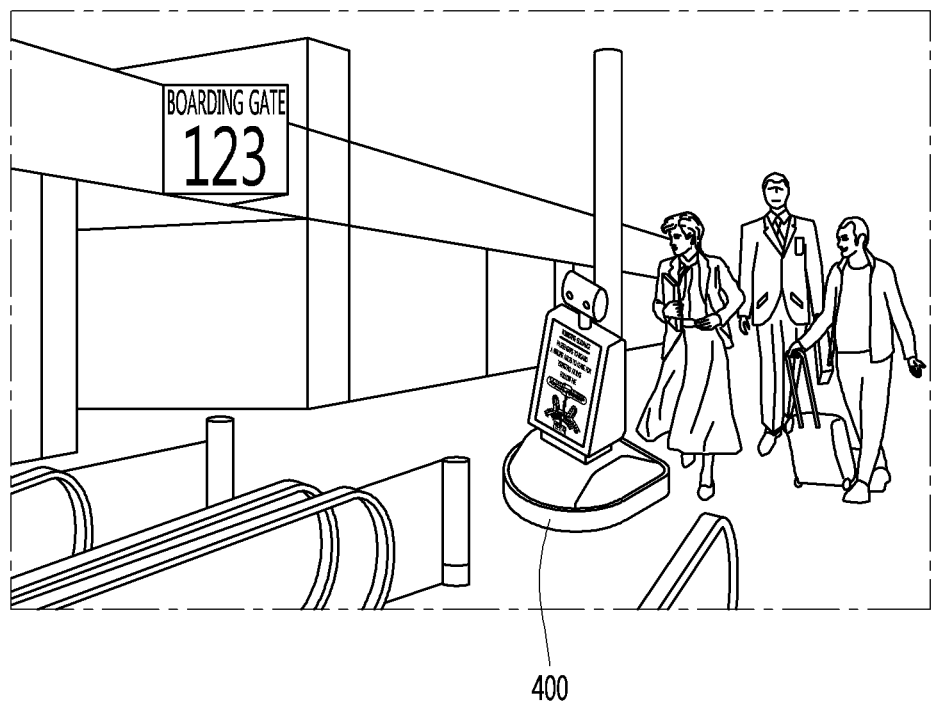

Next, FIGS. 9 and 10 are diagrams for describing a gesture of an airport robot according to an embodiment of the present invention.

First, FIG. 9 is a diagram describing an example where a user checks the display unit 223 of the airport robot 400 which is moving, according to an embodiment of the present invention. The airport robot 400 may be moving at positions at airport along the received movement path. The AP 150 of the airport robot 400 may allow the display unit 223 to display guidance information about a path through which the airport robot 400 is moving in driving. Alternatively, the AP 150 may control the speaker 167 to output guidance information as a voice.

As illustrated in FIG. 9, users may check guidance information displayed by the airport robot 400 which is moving. Alternatively, the users may listen to the guidance information output from the airport robot 400 which is moving and may check the guidance information. Users who lose their ways may look at the guidance information displayed by the airport robot 400 and may follow the airport robot 400 or directly find their ways.

Next, FIG. 10 is a diagram for describing an example where the airport robot 400 guides boarding of persons, according to an embodiment of the present invention. As illustrated in FIG. 10, the AP 150 of the airport robot 400 may shuttle the received movement path, and persons may move along the shuttling airport robot 400 to get way guidance up to a boarding gate.

There is an effect where the airport robot 400 helps persons to easily find a specific position at airport through the above-described method.

FIG. 4 will be described again.

The AP 150 of the airport robot 400 may acquire information about an adjacent place while moving (S111).

The AP 150 of the airport robot 400 may acquire information about an adjacent place while moving through the received movement path. In detail, the AP 150 of the airport robot 400 may acquire area-based congestion information about an adjacent place while moving.

According to an embodiment of the present invention, the AP 150 of the airport robot 400 may sense one or more persons through the thing recognition unit (or sensor) 170 while driving. The AP 150 of the airport robot 400 may acquire in-airport area-based congestion information on the basis of the number of sensed persons.

According to another embodiment of the present invention, the AP 150 of the airport robot 400 may sense voices of persons through the microphone board 164 while driving. The AP 150 of the airport robot 400 may acquire in-airport area-based congestion information on the basis of sensed voice data.

According to another embodiment of the present invention, the AP 150 of the airport robot 400 may acquire area information, which is difficult to move like cleaning or constructing, as information about adjacent places while driving.

The AP 150 of the airport robot 400 may control the LTE router 162 to transmit the acquired information about an adjacent place to the server 300 (S113).

The server 300 may receive the information about the adjacent place from the airport robot 400. The server 300 may re-set a movement path of the airport robot 400 by using the information about the adjacent place.

Moreover, the server 300 may receive changed airplane flight information (S115).

The server 300 may receive the changed airplane flight information from the outside. Alternatively, the server 300 may receive an input of the changed airplane flight information.

The server 300 may reflect the changed airplane flight information and the information about the adjacent place to re-set a movement path in one or more airport robots (S117).

The server 300 may determine whether a re-setting of a movement path in the airport robot 400 is needed, based on the changed airplane flight information. For example, when an airplane departure estimation time is changed or a boarding gate is changed, the server 300 may determine that a re-setting of a movement path in the airport robot 400 is needed.

Moreover, the server 300 may receive information about an adjacent place to determine whether a re-setting of a movement path in the airport robot 400 is needed. For example, when it is determined that some areas included in a movement path previously set in the airport robot 400 are very congested, the server 300 may determine that a re-setting of a movement path in the airport robot 400 is needed.

Figure 11A:
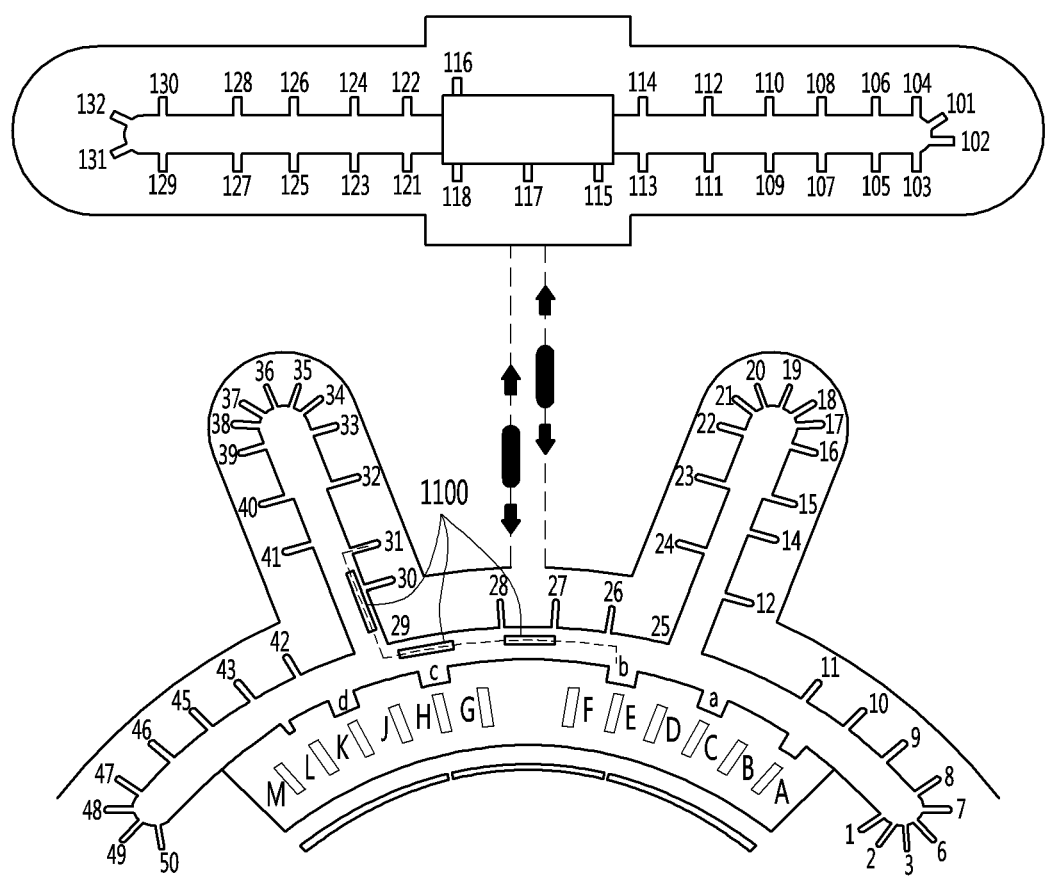
FIGS. 11A and 11B are diagrams for describing a method of re-setting, by a server, a movement path of an airport robot on the basis of in-airport area-based complexity according to an embodiment of the present invention.
Figure 11B:
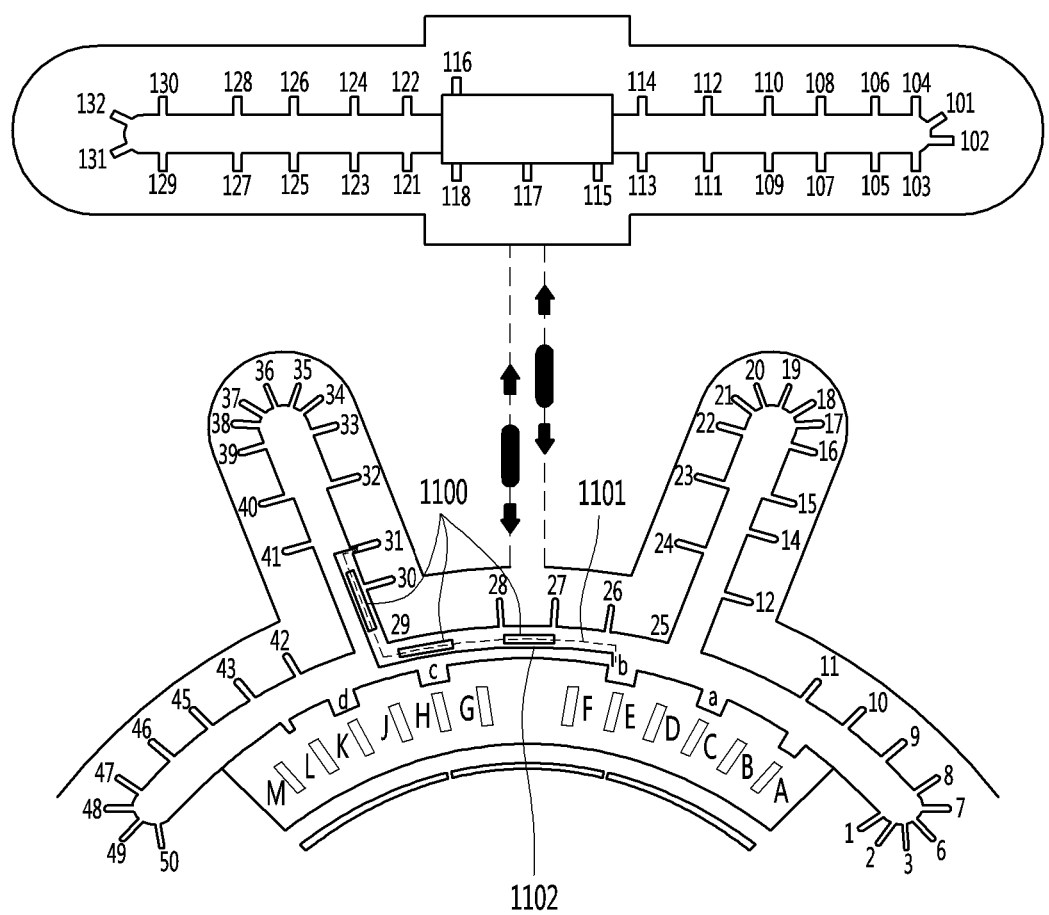

Next, FIGS. 11A and 11B are diagrams for describing a method of re-setting, by a server, a movement path of an airport robot on the basis of in-airport area-based complexity according to an embodiment of the present invention.

The server 300 may acquire in-airport area-based congestion information from the information about the adjacent place received from the airport robot 400. The in-airport area-based congestion information acquired by the server 300 may be as illustrated in FIG. 11A. That is, the server 300 may acquire position information about a movement prohibition area 1100. The movement prohibition area 1100 may denote an area where it is difficult to move due to being crowded with persons or due to a cause such cleaning or construction.

The server 300 may re-set a movement path of the airport robot 400 as illustrated in FIG. 11B, based on the acquired information. For example, a movement path previously set in an arbitrary airport robot 400 may be a first path 1101. The server 300 may determine that the movement prohibition area 1100 is included in the first path 1101, based on the acquired information about the adjacent place. In this case, the server 300 may re-set a movement path of the airport robot 400 so that the movement prohibition area 1100 is excluded from the first path 1101. The server 300 may re-set a second path 1102 illustrated in FIG. 11B. That is, the server 300 may re-set the second path 1102 which does not pass through the movement prohibition area 1100.

In this manner, the airport robot 400 may guide a way which does not pass through a movement prohibition area where it is difficult to move due to being crowded with persons or due to a cause such cleaning or construction.

Next, a method of re-setting, by the server 300, a movement path of the airport robot 400 on the basis of changed airplane flight information will be described.

Figure 13A:
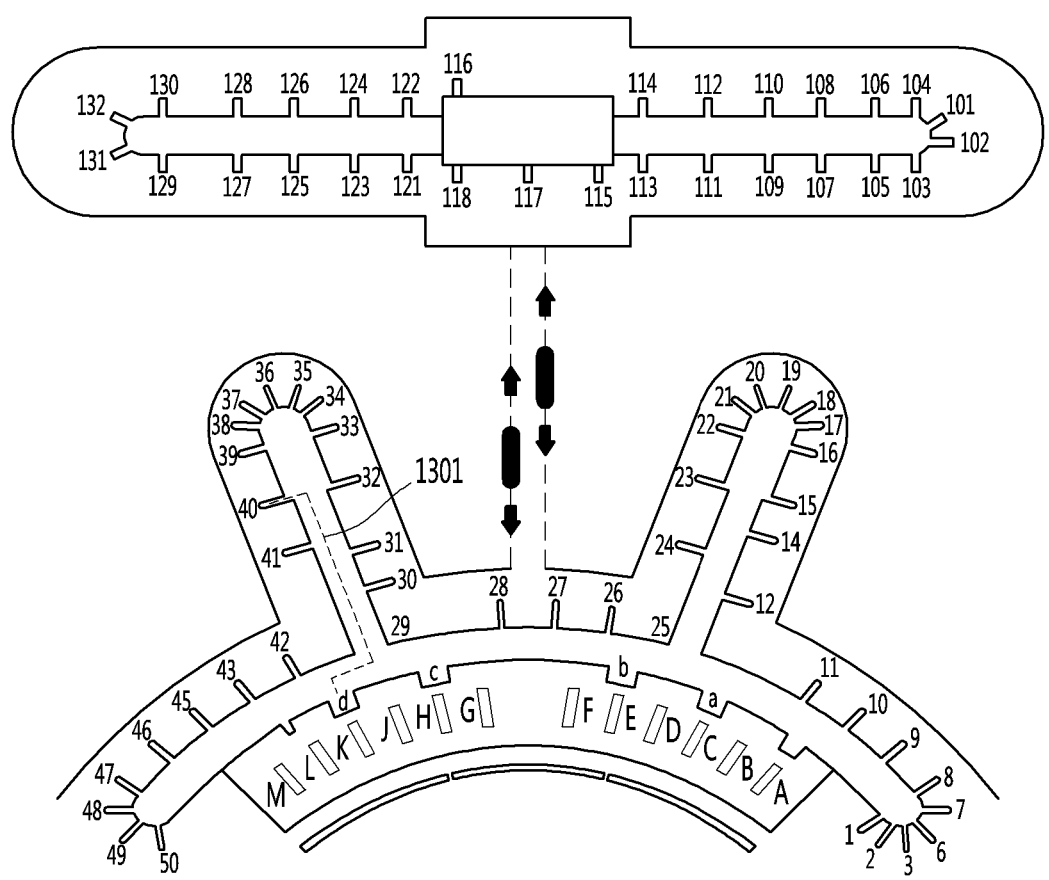
FIGS. 13A and 13B are diagrams for describing a method of re-setting, by a server, a movement path of an airport robot on the basis of changed airplane flight information according to an embodiment of the present invention.
Figure 13B:
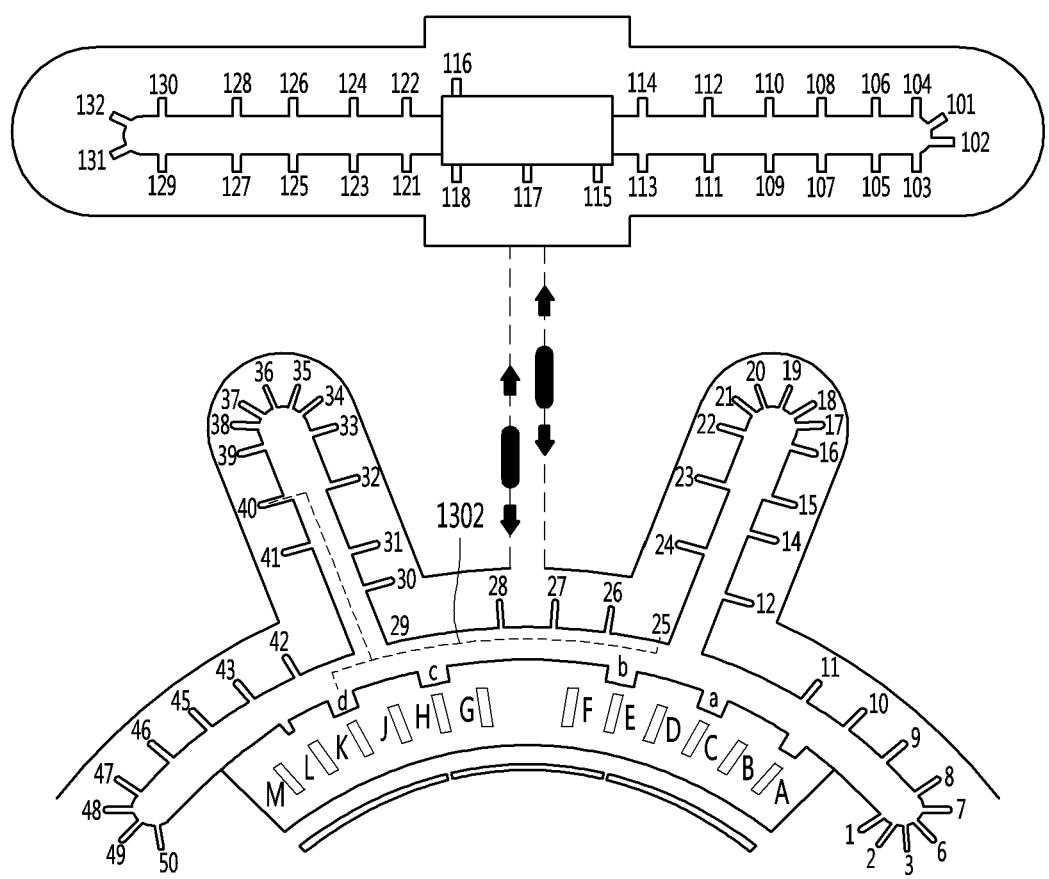

FIG. 12 is a diagram illustrating changed airplane flight information according to an embodiment of the present invention. FIGS. 13A and 13B are diagrams for describing a method of re-setting, by a server, a movement path of an airport robot on the basis of changed airplane flight information according to an embodiment of the present invention.

As illustrated in FIG. 12, the server 300 may acquire information representing that a departure estimation time of an airplane is changed or a boarding gate is changed. That is, as illustrated in FIG. 12, the server 300 may acquire information representing that a departure estimation time of an arbitrary airplane is changed from 9:00 to 9:15 and a boarding gate is changed from 25 to 40. Therefore, the server 300 may re-set one or more of a movement path and a movement time of the airport robot 400.

First, a method of re-setting, by the server 300, a movement path of the airport robot 400 will be described. The server 300 may re-set a preset movement path to a movement path corresponding to a changed boarding gate.

For example, a movement path which is previously set by the server 300 on the basis of a flight airline name C0001 may be a third movement path 703 illustrated in FIG. 7C. According to an embodiment of the present invention, as a boarding gate is changed, the server 300 may re-set the third movement path 703 to a 3-1th movement path 1301 illustrated in FIG. 13A. That is, the server 300 may release the preset movement path 703 and may re-set the 3-1th movement path 1301 which guides persons to a changed boarding gate. Accordingly, there is an effect where, as a boarding gate is changed, users are normally guided to a changed boarding gate.

According to another embodiment of the present invention, as a boarding gate is changed, the server 300 may re-set the third movement path 703 to a 3-2th movement path 1302 illustrated in FIG. 13B. That is, the server 300 may perform a re-setting to include the preset movement path 703 and a movement path which guides persons to a changed boarding gate. Accordingly, there is an effect where users, who move to a before-change boarding gate because the users do not know that a boarding gate is changed, are normally guided to a changed boarding gate.

Next, a method of re-setting, by the server 300, a movement time of the airport robot 400 will be described. A movement time which is set in the airport robot 400 by the server 300 before receiving changed airplane flight information may be as follow. That is, as illustrated in FIGS. 7A to 7E, the server 300 may perform a setting so that a first airport robot 400 moves through a first movement path 701 at 8:05-8:35, a second airport robot 400 moves through a second movement path 702 at 8:15-8:45, a third airport robot 400 moves through a third movement path 703 at 8:20-8:50, a fourth airport robot 400 moves through a fourth movement path 704 at 8:45-9:15, and a fifth airport robot 400 moves through a fifth movement path 701 at 9:05-9:35.

However, as flight information about the flight airline name C0001 is changed, the server 300 may perform a re-setting so that the first airport robot 400 moves through the first movement path 701 at 8:05-8:35, the second airport robot 400 moves through the second movement path 702 at 8:15-8:45, the first airport robot 400 moves through a 3-1th movement path 1301 or a 3-2th movement path at 8:35-9:05, the fourth airport robot 400 moves through the fourth movement path 704 at 8:45-9:15, and the first airport robot 400 moves through the fifth movement path 701 at 9:05-9:35.

Therefore, a guidance operation performed by the first to third airport robots 400 before change may be performed by the first and second airport robots 400 after the change. As described above, movement times of the airport robots 400 may be re-set according to an airplane flight time being changed, and thus, there is an effect where the airport robots 400 may be efficiently disposed.

FIG. 4 will be described again.

The server 300 may transmit changed airplane flight information and a re-set movement path to the airport robot 400 (S119).

The airport robot 400 may receive the changed airplane flight information and the re-set movement path from the server 300.

The airport robot 400 may display guidance information representing a movement path based on the changed airplane flight information (S121).

Figure 14:
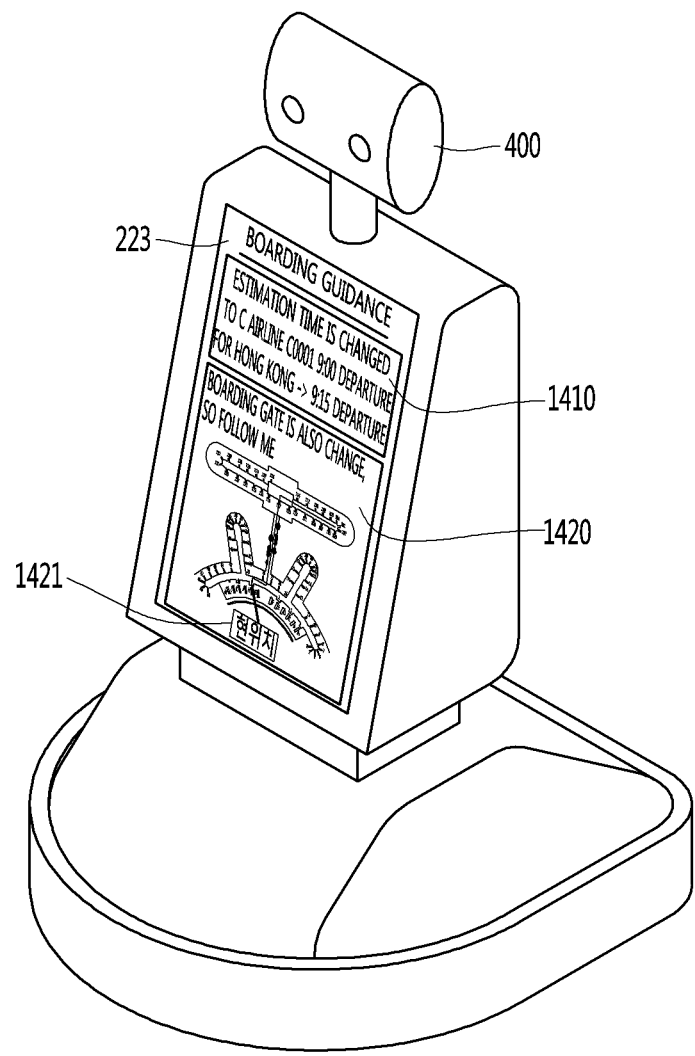
FIG. 14 is a diagram for describing a method of displaying guidance information representing a movement path based on changed airplane flight information according to an embodiment of the present invention.

Next, FIG. 14 is a diagram for describing a method of displaying guidance information representing a movement path based on changed airplane flight information according to an embodiment of the present invention.

As illustrated in FIG. 14, the AP 150 of the airport robot 400 may control the display unit 223 to display guidance information representing changed airplane flight information. The guidance information representing the changed airplane flight information may include changed flight airline information 1410 and a changed movement path map 1420.

The changed flight airline information 1410 includes the changed airplane flight information corresponding to a current movement path of the airport robot 400. In detail, the changed flight airline information 1410 may include one or more of an airline, a flight airline name, a previous departure estimation time, a destination, and a changed departure estimation time of an airplane corresponding to the current movement path. For example, as illustrated in FIG. 14, the AP 150 of the airport robot 400 may control the display unit 223 to display a message "estimation time is changed to C airline C0001 9:00 departure for Hong Kong→9:15 departure". Accordingly, there is an effect where persons may check that a departure estimation time of an airplane to board is changed.

The changed movement path map 1420 represents a path through which the airport robot 400 is currently shuttling, based on a boarding gate being changed. The AP 150 of the airport robot 400 may display a movement path to a before-change boarding gate and a movement path to an after-change boarding gate. Also, there is an effect where the AP 150 may further display a current position mark 1421 to inform users how to move through a changed movement path. Also, there is an effect of quickly informing users of airplane flight change information and allowing the users to respond thereto.

FIG. 4 will be described again.

The AP 150 of the airport robot 400 may control the driving driver 160 to move along a received re-set movement path (S123).

An example where a movement path set by the server 300 is a path from one immigration checkpoint to one boarding gate has been described above, but all movement paths for guiding positions at airport may be included.

Moreover, it is set that the airport robot 400 receives a movement path from the server 300, but a movement path may be directly set by storing airplane flight information in the airport robot 400.

Moreover, the airport robot 400 according to an embodiment of the present invention may further include a thing movement unit (not shown). In this case, there is an effect where the airport robot 400 may guide passengers to a boarding gate, and simultaneously, may move heavy things of the passengers.

According to an embodiment of the present invention, the above-mentioned method can be embodied as computer readable codes on a non-transitory computer readable recording medium having a program thereon. Examples of the computer readable recording medium include ROM, RAM, CD-ROM, magnetic tape, floppy disk, and an optical data storage device. Also, the computer can include an AP 150 of the robot for airport. The above-described display device is not limited to the application of the configurations and methods of the above-described embodiments and the entire or part of the embodiments can be selectively combined and configured to allow various modifications.

The invention claimed is:

1. An airport robot comprising:
 a processor configured to set a movement path through which driving is to be performed for a prescribed time by the airport robot, based on airplane flight information;
 a motor configured to provide a force to drive the airport robot along the movement path; and
 a display configured to present guidance information,
 wherein the guidance information includes at least a portion of the airplane flight information corresponding to the movement path along which the airport robot drives and a movement path map presenting information associated with the movement path, and
 wherein the processor is configured to set the movement path so that the airport robot shuttles between a check-in counter and a boarding gate for a prescribed length of time with respect to a departure estimation time.

2. The airport robot of claim 1, wherein the processor further receives change information identifying a change to the airplane flight information, and re-sets the movement path based on the received change information.

3. The airport robot of claim 2, wherein the re-set movement path includes a portion of the movement path set before receiving the change information and a path through which the airport robot drives at positions requiring guidance based on the change information.

4. The airport robot of claim 3, wherein the display is further configured to present an updated movement path map that includes the portion of the movement path set before receiving the change information, the path through which the airport robot drives at the positions requiring guidance based on the change information, and a current position associated with the airport robot.

5. The airport robot of claim 1, wherein the airplane flight information includes one or more of an airline name, a flight identifier, the departure estimation time, the boarding gate, or a destination associated with a flight.

6. A system comprising:
 a computer configured to store airplane flight information, set a movement path for an airport robot based on the airplane flight information, and transmit the set movement path to the airport robot; and
 the airport robot configured to receive the movement path from the computer and drive based on the movement path,
 wherein the computer further sets the movement path so that the airport robot drives at positions associated with boarding of an airplane for a prescribed time with respect to a departure estimation time included in the airplane flight information, and
 wherein the computer is configured to set the movement path so that the airport robot shuttles between a check-in counter and a boarding gate for a prescribed length of time with respect to the departure estimation time.

7. The system of claim 6, wherein the computer estimates a length of time for which the airport robot drives through the movement path, based on an estimated number of passengers identified in the airplane flight information.

8. The system of claim 7, wherein, when the estimated number of passengers is equal to or greater than a prescribed reference number, the computer estimates the length of time, for which the airport robot drives through the movement path, to be the prescribed time or more, and when the estimated number of passengers is less than the prescribed reference number, the computer estimates the time, for which the airport robot drives through the movement path, to be less than the prescribed time.

9. The system of claim 6, wherein the computer further determines a first time when the number of airplanes estimated to depart is equal to or greater than a prescribed reference number and a second time when the number of airplanes estimated to depart is less than the prescribed reference number, and sets a time for which the airport robot drives through the movement path, based on the departure estimation time included in the airplane flight information and the number of airplanes estimated to depart.

10. The system of claim 9, wherein, when the departure estimation time is within the first time, the computer sets the time, for which the airport robot drives through the movement path, to be the prescribed time or more, and when the departure estimation time is within the second time, the computer sets the time, for which the airport robot drives through the movement path, to be less than the prescribed time.

11. An operating method for an airport robot exchanging data with a computer, the operating method comprising:
 receiving a movement path from the computer;
 driving along the movement path; and
 displaying guidance information while the airport robot is driving through the movement path,
 wherein the guidance information includes at least a portion of airplane flight information corresponding to the movement path along which the airport robot drives and a movement path map providing information associated with the movement path, and wherein the movement path is set so that the airport robot shuttles between a check-in counter and a boarding gate for a prescribed length of time with respect to a departure estimation time.

12. The operating method of claim 11, comprising:

acquiring information about an adjacent place while driving through the movement path, the adjacent place being adjacent to a portion of the movement path;

transmitting the acquired information about the adjacent place to the computer;

receiving a re-set movement path from the computer, the computer identifying the re-set movement path based on the information about the adjacent place; and driving along the re-set movement path and not the movement path, wherein the information about the adjacent place includes at least one of congestion information or in-airport movement prohibition area information about the adjacent place.

13. The operating method of claim 12, wherein acquiring the information about the adjacent place includes:

sensing voices of persons through a microphone included in the airport robot; and acquiring the congestion information based on sensing the voices.

14. The operating method of claim 12, wherein acquiring the information about the adjacent place includes:

sensing persons located in areas at an airport through a sensor included in the airport robot; and acquiring the congestion information based on sensing the persons located at the areas of the airport.

15. The operating method of claim 12, further comprising outputting guidance information representing the re-set movement path.

16. An operating method for a computer exchanging data with an airport robot, the operating method comprising:

storing airplane flight information;

setting a movement path in an airport robots robot based on the airplane flight information; and transmitting the set movement path to the airport robot, wherein setting the movement path includes setting the movement path so that the airport robot shuttles between a check-in counter and a boarding gate for a prescribed length of time with respect to a departure estimation time.

17. The operating method of claim 16, further comprising:

receiving position information about an in-airport movement prohibition area;

re-setting the movement path for the airport robot, based on the position information about the in-airport movement prohibition area; and transmitting the re-set movement path to the airport robot.

18. The operating method of claim 16, wherein:

the airplane flight information includes information identifying one or more of an airline name, a flight identifier, the departure estimation time, a destination, the check-in counter, or the boarding gate associated with a flight.

19. The operating method of claim 17, wherein re-setting the movement path includes:

determining whether the movement prohibition area is included in the set movement path; and re-setting the movement path so that the in-airport movement prohibition area is not included in the re-set movement path.

20. The operating method of claim 17, further comprising receiving change information corresponding to a modification of the airplane flight information, wherein re-setting the movement path includes re-setting the movement path in the airport robot based on the change information and the position information about the in-airport movement prohibition area.

* * * * *